US008724042B2

(12) United States Patent
Hong et al.

(10) Patent No.: US 8,724,042 B2
(45) Date of Patent: May 13, 2014

(54) TWISTED NEMATIC LIQUID CRYSTAL DISPLAY DEVICE

(75) Inventors: Sung-Hwan Hong, Suwon-si (KR);
Soon-Joon Rho, Suwon-si (KR);
Jae-Soo Jang, Suwon-si (KR);
Hee-Seop Kim, Hwaseong-si (KR)

(73) Assignee: Samsung Display Co., Ltd. (KR)

( * ) Notice: Subject to any disclaimer, the term of this patent is extended or adjusted under 35 U.S.C. 154(b) by 80 days.

(21) Appl. No.: 13/205,835

(22) Filed: Aug. 9, 2011

(65) Prior Publication Data

US 2012/0044449 A1    Feb. 23, 2012

(30) Foreign Application Priority Data

Aug. 18, 2010   (KR) .................. 10-2010-0079989

(51) Int. Cl.
*G02F 1/1368* (2006.01)
*G02F 1/1335* (2006.01)

(52) U.S. Cl.
USPC ............ 349/38; 349/39; 349/48; 349/96; 349/119; 349/179

(58) Field of Classification Search
USPC ............. 349/39, 42, 43, 48, 129, 144, 38, 96, 349/117, 119, 122, 167, 179; 345/87, 92, 345/90; 257/59, 72; 359/489.01, 489.02, 359/489.07
See application file for complete search history.

(56) References Cited

U.S. PATENT DOCUMENTS

| | | | | |
|---|---|---|---|---|
| 2005/0179631 A1* | 8/2005 | Lyu | ................................. | 345/87 |
| 2008/0023132 A1* | 1/2008 | Sano et al. | ................ | 156/275.7 |
| 2008/0158455 A1* | 7/2008 | Yoo et al. | ........................ | 349/38 |
| 2010/0157185 A1* | 6/2010 | Kim et al. | ....................... | 349/38 |
| 2012/0105785 A1* | 5/2012 | Kim et al. | ..................... | 349/139 |
| 2012/0147282 A1* | 6/2012 | Shin et al. | ....................... | 349/38 |

* cited by examiner

*Primary Examiner* — Dung Nguyen
*Assistant Examiner* — Tai Duong
(74) *Attorney, Agent, or Firm* — Cantor Colburn LLP

(57) ABSTRACT

A twisted nematic liquid crystal display device includes a first substrate, a plurality of gate lines and a plurality of data lines formed on the first substrate, a plurality of pixels connected to the gate lines and the data lines and each pixel having a first subpixel and a second subpixel, a first subpixel electrode formed in the first subpixel, and a second subpixel electrode formed in the second subpixel. The voltage of the first subpixel electrode is greater than the voltage of the second subpixel electrode, and a ratio of the area of the second subpixel electrode to the area of the first subpixel electrode is in the range of 0.66 to 1.5.

17 Claims, 16 Drawing Sheets

TWISTED NEMATIC LIQUID CRYSTAL DISPLAY DEVICE

This application priority to Korean Patent Application No. 10-2010-0079989 filed on Aug. 18, 2010, and all the benefits accruing therefrom under 35 U.S.C §119, the contents of which in their entirety are herein incorporated by reference.

BACKGROUND OF THE INVENTION (1) Field of the Invention

The present invention relates to a twisted nematic liquid crystal display device, and more particularly, to a twisted nematic liquid crystal display device having high transmittance, low power consumption, rapid response speed, high visibility, and a high contrast ratio.

(2) Description of the Related Art

A liquid crystal display ("LCD") device is a display device which includes a plurality of substrates having electrodes and a liquid crystal layer interposed therebetween to control the amount of light transmitted and rearranging liquid crystal molecules of a liquid crystal layer by applying a signal to the electrodes.

The LCD device further includes a thin film transistor ("TFT") display panel and a common electrode display panel that face each other. On the ITT display panel, a gate line for transmitting a gate signal and a data line for transmitting a data signal cross each other and a TFT which is connected with the gate line and the data line, and a pixel electrode which is connected with the TFT are formed. A light blocking member, a color filter, a common electrode may be formed on the common electrode display panel.

In the conventional LCD device, there are some drawbacks in visibility and a viewing angle thereof. Thus, in a typical plane switching mode LCD device or a vertically aligned mode LCD device, may provide improved visibility and viewing angle thereof, but the response speed and transmittance are low, and power consumption is high.

BRIEF SUMMARY OF THE INVENTION

The present invention obviates the above-mentioned drawbacks by providing a twisted nematic liquid crystal display device having high transmittance, low power consumption, and rapid response speed.

Further, the present invention provides a twisted nematic liquid crystal display device having high visibility and a high contrast ratio.

In addition, the present invention provides a twisted nematic liquid crystal display device which has reduced light leakage when in a black state and an improved viewing angle.

According to an exemplary embodiment of the present invention, a twisted nematic liquid crystal display device is provided. The twisted nematic liquid crystal display device includes a first substrate, a plurality of gate lines and a plurality of data lines formed on the first substrate; a plurality of pixels connected with the gate lines and the data lines and each pixel including a first subpixel and a second subpixel, a first subpixel electrode formed in the first subpixel, and a second subpixel electrode formed in the second subpixel. A voltage of the first subpixel electrode is greater than a voltage of the second subpixel electrode, and a ratio of an area of the second subpixel electrode to an area of the first subpixel electrode may be in a range of about 0.66 to about 1.5.

According to an exemplary embodiment, the area of the first subpixel electrode may be equal to that of the second subpixel electrode.

According to an exemplary embodiment, the twisted nematic liquid crystal display device may further include a switching element connected with the gate line and the data line; a first liquid crystal capacitor and a first storage capacitor connected with the switching element and formed in the first subpixel, a second liquid crystal capacitor and a second storage capacitor connected with the switching element and formed in the second subpixel, and an auxiliary capacitor formed between the switching element and the second liquid crystal capacitor.

According to an exemplary embodiment, a ratio of a capacitance of the auxiliary capacitor to a capacitance of the first storage capacitor may be in a range of about 0.4 to about 1.

According to an exemplary embodiment, the twisted nematic liquid crystal display device may further include a first switching element and a second switching element connected with the gate line and the data line, a first liquid crystal capacitor and a first storage capacitor connected with the first switching element and formed in the first subpixel, a second liquid crystal capacitor and a second storage capacitor connected with the second switching element and formed in the second subpixel, a third switching element connected with the second switching element and switched by a subsequent gate line of a gate line connected with the first switching element, and an auxiliary capacitor connected with the third switching element.

According to an exemplary embodiment, a ratio of the capacitance of the auxiliary capacitor to the capacitance of the first storage capacitor may be in a range of about 0.4 to about 1.

According to an exemplary embodiment, the twisted nematic liquid crystal display device may further include a plurality of storage electrode lines; a first switching element and a second switching element connected with the gate line and the data line, a first liquid crystal capacitor and a first storage capacitor connected with the first switching element and formed in the first subpixel, a second liquid crystal capacitor and a second storage capacitor connected with the second switching element and formed in the second subpixel, a third switching element connected with the gate line and the storage electrode line, an auxiliary capacitor formed between the first switching element and the third switching element; and a fourth switching element connected with the second switching element and the third switching element and switched by a subsequent gate line of a gate line connected with the first, second and third switching elements.

According to an exemplary embodiment, a ratio of the capacitance of the auxiliary capacitor to the capacitance of the first storage capacitor may be in a range of about 0.4 to about 1.

According to an exemplary embodiment, the twisted nematic liquid crystal display device may further include a plurality of storage electrode lines; a first switching element and a second switching element connected to the gate line and the data line, a first liquid crystal capacitor and a first storage capacitor connected with the first switching element, a second liquid crystal capacitor and a second storage capacitor connected with the second switching element, a third switching element including an input terminal connected with the second switching element, a control terminal which is floated, and an output terminal, and an auxiliary capacitor connected with the third switching element and the storage electrode line.

According to an exemplary embodiment, a ratio of the capacitance of the auxiliary capacitor to the capacitance of the first storage capacitor may be in a range of about 0.4 to about 1.

According to an exemplary embodiment, the twisted nematic liquid crystal display device may further include a second substrate facing the first substrate; and a liquid crystal layer formed between the first substrate and the second substrate, including liquid crystals having a driving voltage in a range of about 2.5V to about 4V.

According to an exemplary embodiment, the twisted nematic liquid crystal display device may further include a second substrate facing the first substrate, a discotic liquid crystal ("DLC") layer formed on outer surfaces of the first substrate and the second substrate, a tri acetyl cellulous ("TAC") layer formed on an outer surface of the DLC layer, and a poly vinyl alcohol ("PVA") layer formed on an outer surface of the TAC layer.

According to an exemplary embodiment, a retardation in a thickness direction of the DLC layer may be in a range of about 150 nm to about 180 nm, the average inclination angle of the DLC layer may be in the range of 45 degrees to 50 degrees, and the retardation in the thickness direction of the TAC layer may be in a range of about 70 nm to about 100 nm.

According to an exemplary embodiment, the twisted nematic liquid crystal display device may further include a compensation film formed by at least one of a biaxial film, an A-plate, and a C-plate formed on an outer surface of the PVA layer. A retardation of the compensation film may be in a range of about 70 to about 150 nm.

According to an exemplary embodiment, the twisted nematic liquid crystal display device may further include a compensation film formed by at least one of a biaxial film, an A-plate, and a C-plate formed on an outer surface of the PVA layer. A retardation of the compensation film may be in a range of about 55 nm to about 70 nm.

According to an exemplary embodiment, the twisted nematic liquid crystal display device may further include a polarizer pattern formed in the second subpixel on an inner surface of at least one of the first substrate and the second substrate. A retardation of the polarizer pattern may be in a range of about 70 nm to about 150 nm.

According to an exemplary embodiment, the twisted nematic liquid crystal display device may further include a polarizer pattern formed in the second subpixel on an inner surface of at least one of the first substrate and the second substrate. A retardation of the polarizer pattern may be in a range of about 55 nm to about 70 nm.

According to an exemplary embodiment, the twisted nematic liquid crystal display device may further include a compensation film formed by at least one of a biaxial film, an A-plate, and a C-plate formed on an outer surface of the PVA layer, and a polarizer pattern formed in the second subpixel on an inner surface of at least one of the first substrate and the second substrate. A retardation of the compensation film may be in a range of about 55 nm to about 100 nm and a retardation of the polarizer pattern may be in a range of about 55 nm to about 70 nm.

According to the exemplary embodiment, the twisted nematic liquid crystal display device has several advantages. For example, increased transmittance, reduced power consumption, and increased response speed.

Further, according to an exemplary embodiment of the present invention, a pixel electrode includes two subpixel electrodes, where a voltage applied to one subpixel is lower than the voltage applied to the other subpixel electrode, and a ratio in area between the subpixel electrodes is limited to a predetermined range, thereby optimizing visibility and a contrast ratio of the liquid crystal display device.

Further, exemplary embodiments of the present invention reduce light leakage while in a black state and improve a viewing angle by applying a suitable compensation film to the twisted nematic liquid crystal display device.

BRIEF DESCRIPTION OF THE DRAWINGS

The above and other aspects, advantages and features of this disclosure will become more apparent by describing in further detail exemplary embodiments thereof with reference to the accompanying drawings in which.

DETAILED DESCRIPTION OF THE INVENTION

Figure 1:
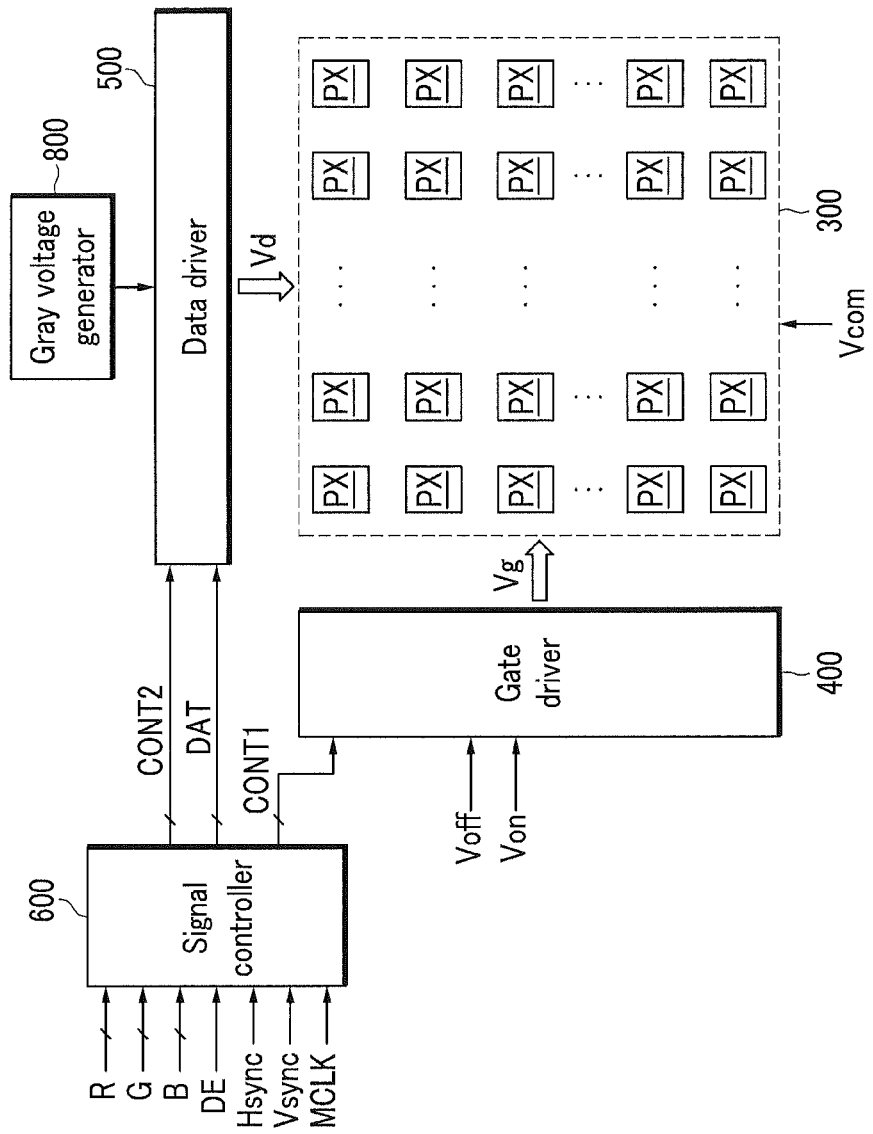
FIG. 1 is a block diagram illustrating an exemplary embodiment of a liquid crystal display device according to the present invention.

The invention will be described more fully hereinafter with reference to the accompanying drawings, in which embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art.
Like reference numerals refer to like elements throughout.

It will be understood that when an element is referred to as being "on" another element, it can be directly on the other element or intervening elements may be present therebetween. In contrast, when an element is referred to as being "directly on" another element, there are no intervening elements present. As used herein, the term and/or includes any and all combinations of one or more of the associated listed items It will be understood that, although the terms first, second, third etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, a first element, component, region, layer or section discussed below could be termed a second element, component, region, layer or section without departing from the teachings of the present invention.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Furthermore, relative terms, such as "lower" or "bottom" and "upper" or "top," may be used herein to describe one element's relationship to another elements as illustrated in the Figures. It will be understood that relative terms are intended to encompass different orientations of the device in addition to the orientation depicted in the Figures. For example, if the device in one of the figures is turned over, elements described as being on the "lower" side of other elements would then be oriented on "upper" sides of the other elements. The exemplary term "lower", can therefore, encompasses both an orientation of "lower" and "upper," depending on the particular orientation of the figure. Similarly, if the device in one of the figures is turned over, elements described as "below" or "beneath" other elements would then be oriented "above" the other elements. The exemplary terms "below" or "beneath" can, therefore, encompass both an orientation of above and below.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Exemplary embodiments of the present invention are described herein with reference to cross section illustrations that are schematic illustrations of idealized embodiments of the present invention. As such, variations from the shapes of the illustrations as a result, for example, of manufacturing techniques and/or tolerances, are to be expected. Thus, embodiments of the present invention should not be construed as limited to the particular shapes of regions illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present invention.

All methods described herein can be performed in a suitable order unless otherwise indicated herein or otherwise clearly contradicted by context. The use of any and all examples, or exemplary language (e.g., "such as"), is intended merely to better illustrate the invention and does not pose a limitation on the scope of the invention unless otherwise claimed. No language in the specification should be construed as indicating any non-claimed element as essential to the practice of the invention as used herein.

Hereinafter, the present invention will be described in detail with reference to the accompanying drawings.

Figure 2:
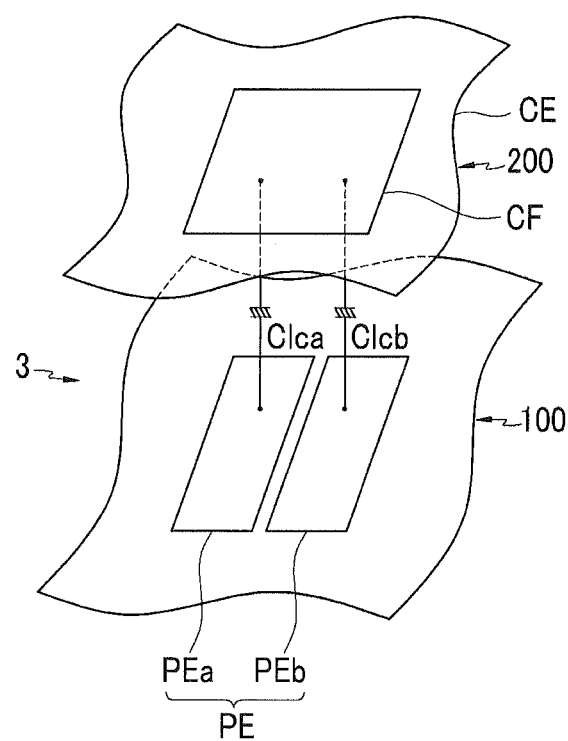
FIG. 2 is an equivalent circuit diagram of an exemplary embodiment of a pixel of a liquid crystal display device according to the present invention.

FIG. 1 is a block diagram illustrating an exemplary embodiment of a liquid crystal display device according to the present invention and FIG. 2 is an equivalent circuit diagram illustrating an exemplary embodiment of a pixel of the liquid crystal display device according to the present invention.

As shown in FIG. 1, the liquid crystal display device includes a liquid crystal panel assembly 300, a gate driver 400 and a data driver 500 that are connected thereto, a gray voltage generator 800 connected with the data driver 500, and a signal controller 600 connected with and controlling the gate driver 400 and the data driver 500 and.

According to an exemplary embodiment, the liquid crystal panel assembly 300 includes a plurality of signal lines (not shown) and a plurality of pixels PX connected with the signal lines and arranged in a matrix formation. As shown in FIG. 2, the liquid crystal panel assembly 300 includes lower and upper display panels 100 and 200 facing each other and a liquid crystal layer 3 interposed therebetween.

The signal lines include a plurality of gate lines (not shown) transferring a gate signal (also referred to as "scan signal") and a plurality data lines (not shown) transferring a data signal. The gate lines extend substantially in a row direction and are parallel to each other and the data lines extend substantially in a column direction and are parallel to each other.

According to an exemplary embodiment, each pixel PX includes a pair of subpixels (e.g., a first subpixel and a second subpixel) and each subpixel includes liquid crystal capacitors Clca and Clcb. At least one of two subpixels includes a switching element (not shown) connected with the gate lines, the data lines, and the liquid crystal capacitors Clca and Clcb.

According to an exemplary embodiment, the liquid crystal capacitors Clca and Clcb use subpixel electrodes PEa and PEb of a lower display panel 100 and a common electrode CE of an upper display panel 200 as two terminals and the liquid crystal layer 3 interposed between the subpixel electrodes PEa/PEb and the common electrode CE serves as a dielectric. The pair of subpixel electrodes PEa and PEb are separated from each other and together form a pixel electrode PE. The common electrode CE is formed on a total surface of the upper display panel 200 and is applied with a common voltage Vcom. The liquid crystal layer 3 has positive dielectric anisotropy and liquid crystal molecules of the liquid crystal layer 3 are aligned while the direction of the liquid crystal molecules is twisted at about 90° without an electric field.

According an exemplary embodiment, to implement the display of colors, each pixel PX uniquely displays one of primary colors in a spatial division. Alternatively, according to another exemplary embodiment, each pixel PX alternately displays the primary colors depending on a timing sequence in temporal division. Thus, the present invention enables a desired color to be recognized through the spatial and temporal sums of the primary colors. Examples of the primary colors may include three primary colors of a red color, a green color, and a blue color. FIG. 2 illustrates an exemplary embodiment of the spatial division where each pixel PX includes a color filter CF displaying one of the primary colors in the area of the upper display panel 200. Alternatively, according to another exemplary embodiment, the color filter CF may be formed above or below the subpixel electrodes PEa and PEb of the lower display panel 100.

At least one polarizer (not shown) which polarizes light is attached onto the outer surface of the liquid crystal panel assembly 300.

Referring back to FIG. 1, the gray voltage generator 800 generates a total gray voltage relating to the transmittance of the pixel PX or a predetermined number of gray voltages (hereinafter, referred to as "reference gray voltage"). According to an exemplary embodiment, the reference gray voltage may include a voltage having a positive value and a voltage a negative value with respect to the common voltage Vcom.

According to an exemplary embodiment, the gate driver 400 is connected with the gate lines of the liquid crystal panel assembly 300 to apply the gate signal constituted by combining a gate-on voltage Von and a gate-off voltage Voff with each other to the gate lines.

The data driver 500 is connected with the data lines of the liquid crystal panel assembly 300, and selects a gray voltage from the gray voltage generator 800 and applies it to the data lines as the data signal. If the gray voltage generator 800 does not provide all voltages for all grays but provides only reference gray voltages of a predetermined number, the data driver 500 divides the reference gray voltages, generates gray voltages for all the grays, and selects the data signal among them.

The signal controller 600 includes an image signal converter 610 and controls the gate driver 400 and the data driver 500.

According to an exemplary embodiment, each of the drivers 400, 500, 600, and 800 may be directly mounted on the liquid crystal panel assembly 300 in the form of at least one integrated circuit chip, or mounted on a flexible printed circuit film (not shown) to be attached to the liquid crystal panel assembly 300 in the form of a tape carrier package ("TCP"), or mounted on an additional printed circuit board (not shown). According to another exemplary embodiment, the drivers 400, 500, 600, and 800 may be integrated on the liquid crystal panel assembly 300 together with the signal lines and the thin film transistor switching elements. Further, the drivers 400, 500, 600, and 800 may be integrated as a single chip. At least one of drivers 400, 500, 600 and 800 or at least one circuit element at least one driver 400, 500, 600 and 800 may be installed outside of the single chip.

Now referring to FIGS. 3 and 4, an exemplary embodiment of a twisted nematic liquid crystal display device according to the present invention will be described in detail.

Figure 3:
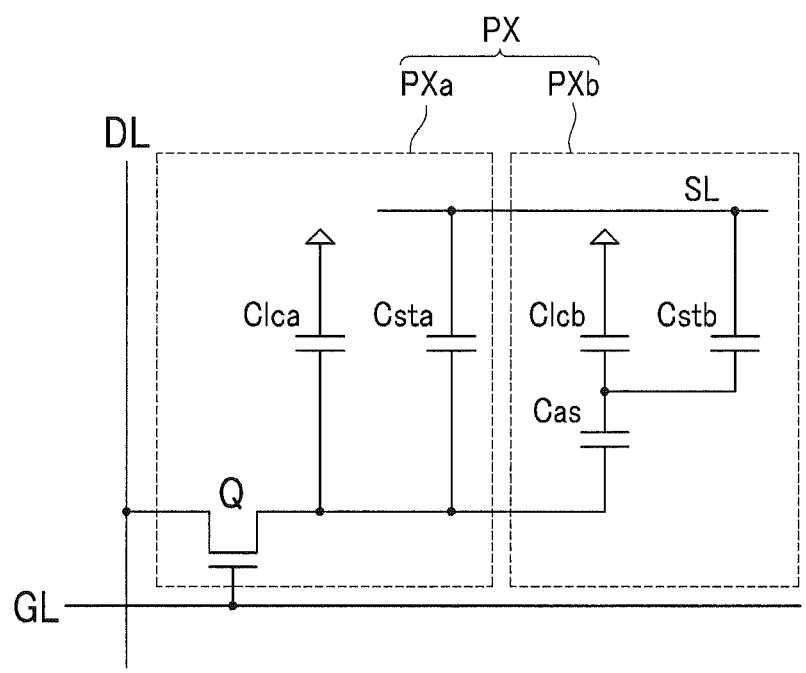
FIG. 3 is an equivalent circuit diagram illustrating an exemplary embodiment of a pixel of a twisted nematic liquid crystal display device according to the present invention.
Figure 4:
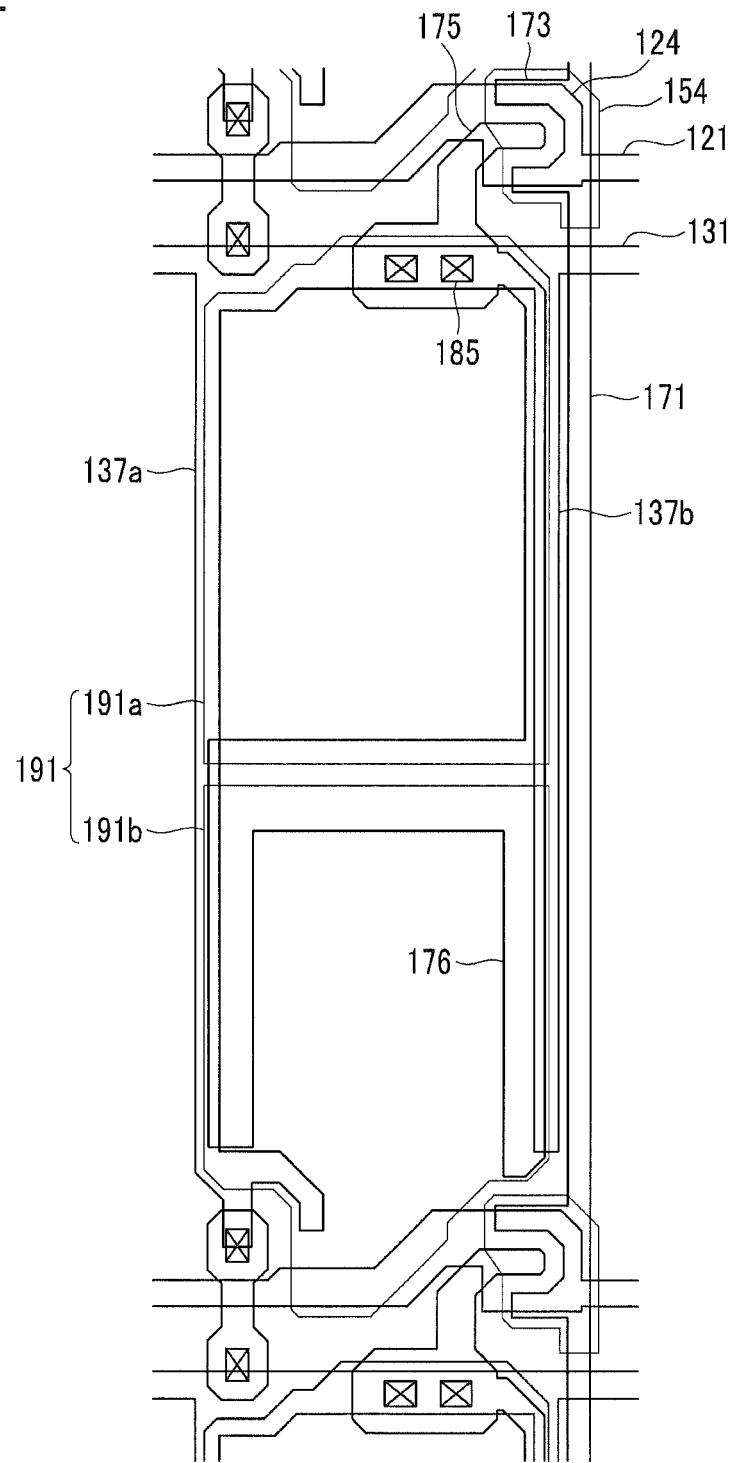
FIG. 4 is a plan view of an exemplary embodiment of a lower display panel of the twisted nematic liquid crystal display device according to the present invention.

FIG. 3 is an equivalent circuit diagram illustrating an exemplary embodiment of a pixel of the twisted nematic liquid crystal display device according to the present invention, and FIG. 4 is a plan view illustrating an exemplary embodiment of a lower display panel of the twisted nematic liquid crystal display device according to the he present invention.

As shown in FIG. 3, the twisted nematic liquid crystal display device includes signal lines including a plurality of gate lines GL, a plurality of data lines DL, and a plurality of storage electrode lines SL and a plurality of pixels PX connected thereto. Each pixel PX includes a pair of first and second subpixels PXa and PXb. A first subpixel electrode 191a as shown in FIG. 4 is formed in the first subpixel PXa and a second subpixel electrode 19b as shown in FIG. 4 is formed in the second subpixel PXb.

According an exemplary embodiment, the twisted nematic liquid crystal display device according to the present invention further includes a switching element Q connected with the gate line GL and the data line DL, a first liquid crystal capacitor Clca and a first storage capacitor Csta are connected to with switching element Q and formed in the first subpixel PXa and a second liquid crystal capacitor Clcb and a second storage capacitor Cstb are connected with the switching element Q and formed in the second subpixel PXb, and an auxiliary capacitor Cas formed between the switching element Q and the second liquid crystal capacitor Clcb.

According to an exemplary embodiment, the switching element Q is a three-terminal element such as a thin film transistor ("TFT") for example, provided on the lower display panel 100 and including a control terminal thereof which is connected with the gate line GL, an input terminal thereof which is connected with the data line DL, and an output terminal thereof which is connected with the first liquid crystal capacitor Clca, the first storage capacitor Csta, and the auxiliary capacitor Cas.

One terminal of the auxiliary capacitor Cas is connected to an output terminal of the switching element Q and the other terminal thereof is connected to the second liquid crystal capacitor Clcb and the second storage capacitor Cstb.

According to an exemplary embodiment, a charged voltage of the second liquid crystal capacitor Clcb is lower than a charged voltage of the first liquid crystal capacitor Clca by the auxiliary capacitor Cas, to thereby improve the side visibility of the liquid crystal display device.

According to an exemplary embodiment, the twisted nematic liquid crystal display device according to the present invention, a plurality of gate conductors including a plurality of gate lines 121 and a plurality of storage electrode lines 131 are formed on an insulation substrate (not shown) which is made of transparent glass or plastic as shown in FIG. 4.

The gate lines 121 transfer a gate signal and extend substantially in a horizontal direction. Each of the gate lines 121 includes a plurality of gate electrodes 124 which are protruded upward.

According to an exemplary embodiment, the storage electrode line 131 is applied with a predetermined voltage and extends substantially in parallel to the gate line 121. Each storage electrode line 131 is positioned between two adjacent gate lines 121. The storage electrode line 131 includes storage electrodes 137a and 137b that extend downward. The present invention is not limited to the storage electrode line 131 and the storage electrodes 137a and 137b being of a particular shape or layout and may be of various shapes and layouts.

A gate insulating layer (not shown) is formed on the gate conductors 121 and 131. An island-shaped semiconductor 154 is formed on the gate insulating layer. The semiconductor 154 is positioned on the gate electrode 124.

A data conductor including a plurality of data lines 171 and a drain electrode 175 are formed on the semiconductor 154 and the gate insulating layer.

The data lines 171 transfer a data signal and extend primarily in a vertical direction to intersect the gate lines 121 and the storage electrode lines 131. Each data line 171 includes a source electrode 173 which extends toward the gate electrode 124.

The drain electrode 175 is separated from the data line 171 and includes a rod-shaped end facing the source electrode 173 on the basis of the gate electrode 124. The rod-shaped end is partially surrounded by the source electrode 173 which is bent.

The other end of the drain electrode 175 extends substantially in parallel to the data line 171 and formed over the first subpixel PXa and the second subpixel PXb. The other end formed in the second subpixel PXb is referred to as an auxiliary electrode 176.

A passivation layer (not shown) is formed on the data conductors 171 and 175 and the semiconductor 154. The passivation layer may be made of an inorganic insulating material or an organic insulating material and may have a flat surface and may have a dual-layer structure including a lower inorganic layer and an upper organic layer to prevent an exposed part of the semiconductor 154 from being damaged while utilizing an excellent insulation property of the organic layer.

A plurality of pixel electrodes 191 are formed on the passivation layer. Each pixel electrode 191 includes a first subpixel electrode 191a and a second subpixel electrode 191b which are separated from each other with a predetermined interval.

The first subpixel electrode 191a is connected to the drain electrode 175 through a contact hole 185. The second subpixel electrode 191b overlaps the auxiliary electrode 176 to form the auxiliary capacitor Cas.

According to an exemplary embodiment, the first and second subpixel electrodes 191a and 191b constitute the first and second liquid crystal capacitors Clca and Clcb shown in FIG. 2 together with the common electrode CE shown in FIG. 2 of the upper display panel 200 shown in FIG. 2, and the liquid crystal layer 3 shown in FIG. 2 interposed therebetween, to store the applied voltage even after the switching element Q shown in FIG. 3 is turned off.

The first and second subpixel electrode 191a and 191b are overlapped with storage electrodes 137a and 137b to constitute the first and second storage capacitors Csta and Cstb and strengthen the voltage storage abilities of the first and second liquid crystal capacitors Clca and Clcb.

Although the auxiliary electrode 176 is formed by extending the drain electrode 175 in accordance with an exemplary embodiment, the present invention is not limited thereto and the auxiliary electrode 176 may be separated from the drain electrode 175. Thus, a contact hole may be formed on the passivation layer which is positioned on the top of the first subpixel electrode 191a and the auxiliary electrode 176 is connected to the first subpixel electrode 191a through the contact hole to overlap the second subpixel electrode 191b.

Now referring to FIGS. 5 and 6, another exemplary embodiment of a twisted nematic liquid crystal display device according to the present invention will now be described in detail.

Figure 5:
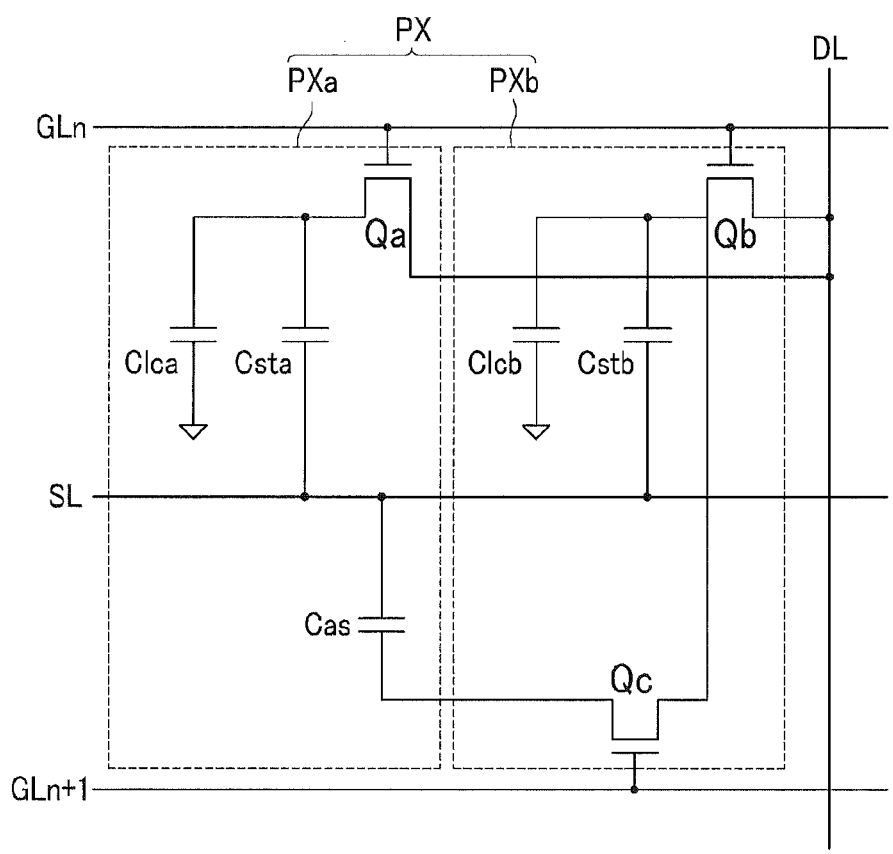
FIG. 5 is an equivalent circuit diagram illustrating another exemplary embodiment of a pixel of a twisted nematic liquid crystal display device according to the present invention.
Figure 6:
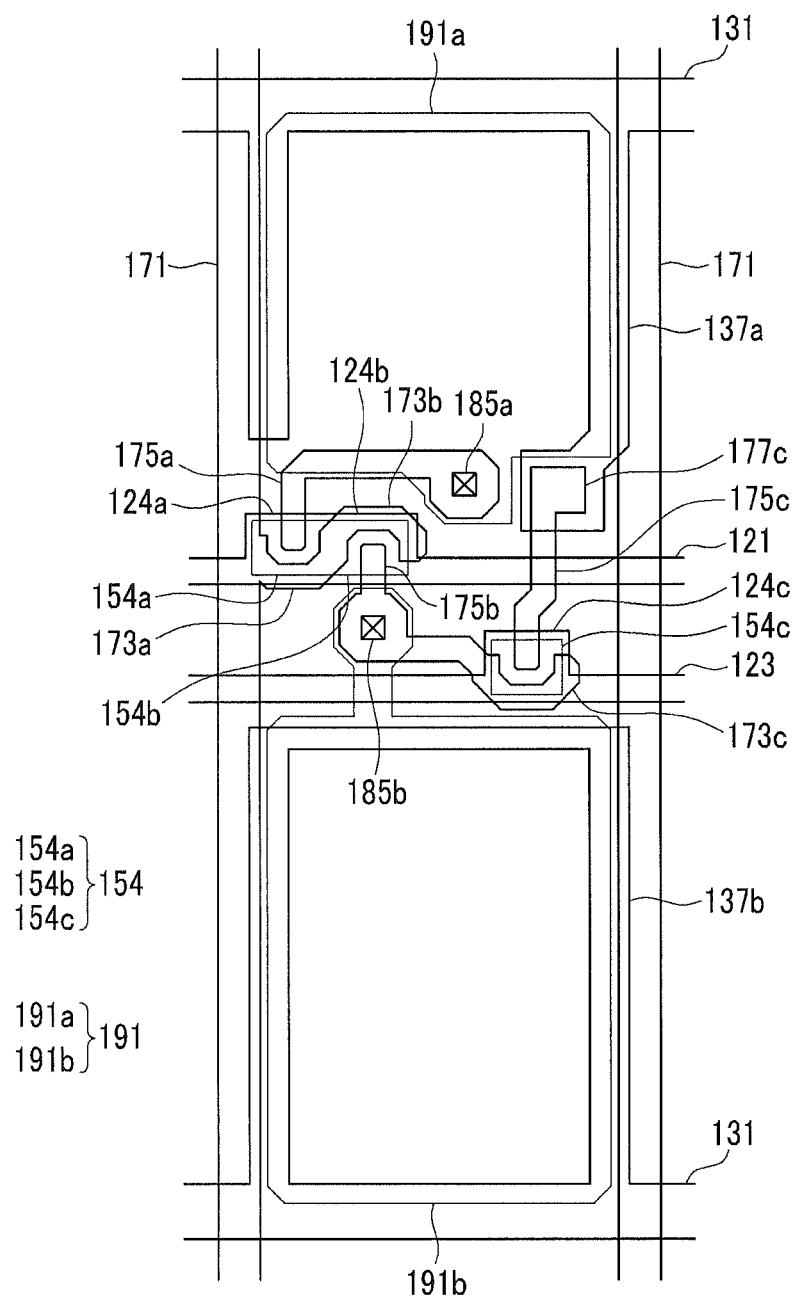
FIG. 6 is a plan view illustrating another exemplary embodiment of a lower display panel of the twisted nematic liquid crystal display device according to the present invention.

FIG. 5 is an equivalent circuit diagram illustrating an exemplary embodiment of a pixel of a twisted nematic liquid crystal display device according to the present invention and FIG. 6 is a plan view illustrating an exemplary embodiment of a lower display panel of the twisted nematic liquid crystal display device according to the present invention.

According to an exemplary embodiment, the twisted nematic liquid crystal display device includes signal lines including a plurality of gate lines $GL_n$ and $GL_{n+1}$, a plurality of data lines DL, and a plurality of storage electrode lines SL and a plurality of pixels PX connected thereto. As shown, each pixel PX includes a pair of first and second subpixels PXa and PXb. The first subpixel electrode (191a of FIG. 4) is formed in the first subpixel PXa and the second subpixel electrode (191b of FIG. 4) is formed in the second subpixel PXb.

The twisted nematic liquid crystal display device further includes a first switching element Qa and a second switching element Qb which are connected with the gate line $GL_n$ and the data line DL, a first liquid crystal capacitor Clca and a first storage capacitor Csta which are connected with the first switching element Qa and formed in the first subpixel PX, a second liquid crystal capacitor Clcb and a second storage capacitor Cstb which are connected to the second switching element Qb and formed in the second subpixel, a third switching element Qc which is connected with the second switching element Qb and switched by the subsequent gate line $GL_{n+1}$, and an auxiliary capacitor Cas connected with the third switching element Qc.

The first and second switching elements Qa and Qb, may be three-terminal elements such as TFTs provided on a lower display panel 100, and including control terminals thereof connected with the gate line $GL_n$, input terminals thereof connected with the data line DL, and output terminal thereof connected with the first liquid crystal capacitor Clca and the first storage capacitor Csta and the second liquid crystal capacitor Clcb and the second storage capacitor Cstb, respectively.

The third switching element Qc may also be three-terminal element such as the thin film transistor, and the like provided on the lower display panel 100 includes a control terminal connected to the subsequent gate line $GL_{n+1}$, an input terminal connected to the second liquid crystal capacitor Clcb, and an output terminal connected to the auxiliary capacitor Cas.

A terminal of the auxiliary capacitor Cas is connected with the output terminal of the third switching element Qc and the other terminal is connected to a storage electrode line SL.

Hereinafter, an exemplary embodiment of an operation of the twisted nematic liquid crystal display device according to the present invention will be described. When a gate-on voltage is applied to the gate line $GL_n$, the first and second switching elements Qa and Qb that are connected thereto are turned on and a data voltage of the data line 171 is applied to the first and second subpixel electrodes 191a and 191b as shown in FIG. 6.

Subsequently, when a gate-off voltage is applied to the gate line $GL_n$ and the gate-on voltage is applied to the subsequent gate line $GL_{n+1}$, the first and second switching elements Qa and Qb are turned off and the third switching element Qc is turned on. As a result, electric charges of the second subpixel electrode 191b as shown in FIG. 6 connected to the output terminal of the second switching element Qb flow into the auxiliary capacitor Cas to drop the voltage of the second liquid crystal capacitor Clcb.

As described above, according to an exemplary embodiment, the charged voltages of the first and second liquid crystal capacitors Clca and Clcb may be different from each other to improve the side visibility of the liquid crystal display device.

According to an exemplary embodiment, a plurality of gate conductors including a plurality of first gate lines 121, a plurality of second gate lines 123, and a plurality of storage electrodes lines 131 are formed on an insulation substrate (not shown) which is made of transparent glass or plastic as shown in FIG. 6.

The first gate line 121 and the second gate line 123 extend primarily in a horizontal direction and transfer a gate signal. The first gate line 121 includes a first gate electrode 124a and a second gate electrode 124b that protrude in an upward direction. The second gate line 123 includes a third gate electrode 124c which protrudes in an upward direction. The first gate electrode 124a and the second gate electrode 124b are connected with each other to form one protrusion.

The storage electrode line 131 extends primarily in the horizontal direction and transfers a predetermined voltage such as a common voltage, or the like. The storage electrode line 131 includes storage electrodes 137a and 137b that extend vertically. Thus, according to an exemplary embodiment of the present invention, the shapes and layouts of the storage electrode line 131 and the storage electrodes 137a and 137b may be variously changed.

A gate insulating layer (not shown) is formed on the gate conductors 121, 123, and 131.

According to an exemplary embodiment, a plurality of island-shaped semiconductors 154a, 154b and 154c are formed on the gate insulating layer 140. The semiconductor 154 includes a first semiconductor 154a positioned on the first gate electrode 124a, a semiconductor 154b positioned on the second gate electrode 124b, and a third semiconductor 154c positioned on the third gate electrode 124c. The first semiconductor 154a and the second semiconductor 154b may be connected to each other.

A data conductor including a plurality of data lines 171, a first drain electrode 175a, a second drain electrode 175b, a third source electrode 173c, and a third drain electrode 175c is formed on the semiconductor 154 and the gate insulating layer.

The data lines 171 transfer a data signal and extend primarily in a vertical direction to cross the first gate line 121 and the second gate line 123. Each data line 171 includes a first source electrode 173a and a second source electrode 173b that extend toward the first gate electrode 124a and the second gate electrode 124b. The first source electrode 173a and the second source electrode 173b are connected to each other.

According to an exemplary embodiment, each of the first drain electrode 175a, the second drain electrode 175b, and the third drain electrode 175c includes a wide end portion and another rod-shaped end portion. The rod-shaped end portions of the first drain electrode 175a and the second drain electrode 175b are partially surrounded by the first source electrode 173a and the second source electrode 173b, respectively. The third drain electrode 175c is also partially surrounded by the third source electrode 173c. An end portion (e.g., the wider end portion) of the second drain electrode 175b is connected to the third source electrode 173c. The wide end portion 177c of the third drain electrode 175c is partially overlapped with an extension portion 137a of the storage electrode line 131 to form an auxiliary capacitor Cas.

According to an exemplary embodiment first, second and third gate electrodes 124a, 124b and 124c, the first, second, and third source electrode 173a, 173b and 173c, and the first, second, and third drain electrode 175a, 175b and 175c form a first, second or third switching element Qa, Qb, Qc as shown in FIG. 5 together with the first, second, third or semiconductor 154a, 154b, and 154c. A channel of the respective switching element Qa, Qb or Qc is formed in each semiconductor 154a, 154b, 154c between each source electrode 173a, 173b and 173c and each drain electrode 175a, 175b, 175c.

A passivation layer (not shown) is formed on the data lines 171, the drain electrodes 175a, 175b, and 175c and exposed portions of the semiconductors 154a, 154b, and 154c.

A plurality of contact holes 185a and 185b that expose the wide end portion of the first drain electrode 175a and the wide end portion of the second drain electrode 175b, respectively are formed on the passivation layer.

A plurality of pixel electrodes 191 are formed on the passivation layer. The pixel electrode 191 has a substantially quadrangular shape on the whole and includes a first subpixel electrode 191a and a second subpixel electrode 191b that are spaced apart from each other by a predetermined gap.

The first subpixel electrode 191a is applied with a data voltage from the first drain electrode 175a through the contact hole 185a and the second subpixel electrode 191b is applied with the data voltage from the second drain electrode 175b through the contact hole 185b.

According to an exemplary embodiment, the first and second subpixel electrodes 191a and 191b forms the first and second liquid crystal capacitors Clca and Clcb as shown in FIG. 2 together with the common electrode CE as shown in FIG. 2 of the upper display panel 200 as shown in FIG. 2 and the liquid crystal layer 3 as shown in FIG. 2 to store the applied voltage even after the switching elements Qa and Qb as shown in FIG. 5 are turned off.

The first and second subpixel electrodes 191a and 191b are overlapped with the storage electrodes 137a and 137b to form the first and second storage capacitors Csta and Cstb and strengthen the voltage storing abilities of the first and second liquid crystal capacitors Clca and Clcb.

Now referring to FIGS. 7 and 8, another exemplary embodiment of a twisted nematic liquid crystal display device according to the present invention will now be described in detail.

Figure 7:
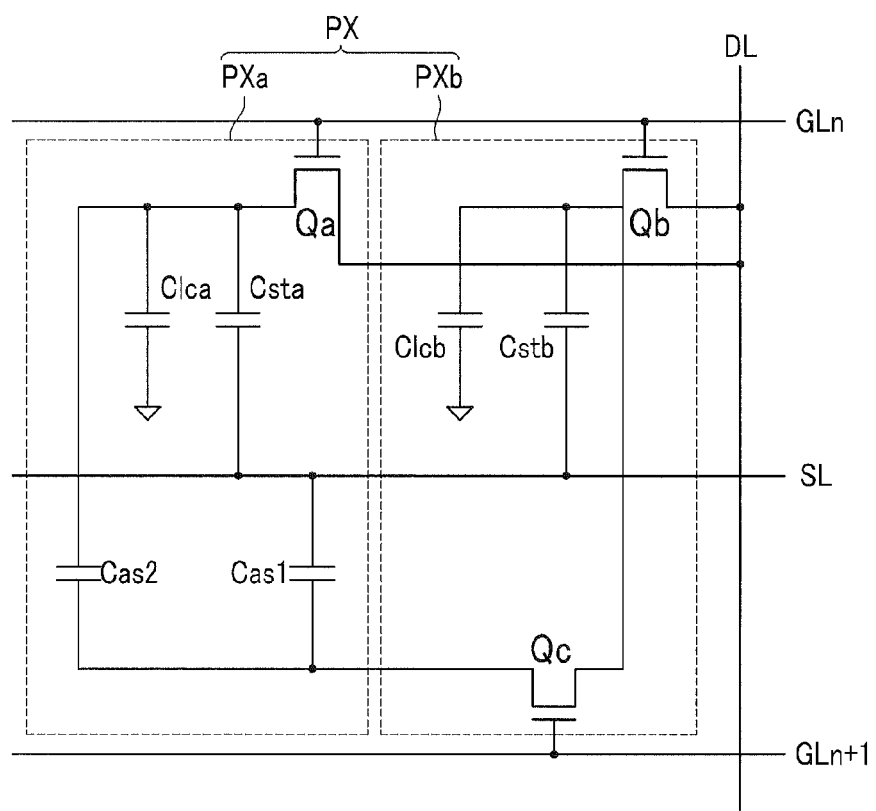
FIG. 7 is an equivalent circuit diagram another exemplary embodiment of a pixel of a twisted nematic liquid crystal display device according to the present invention.
Figure 8:
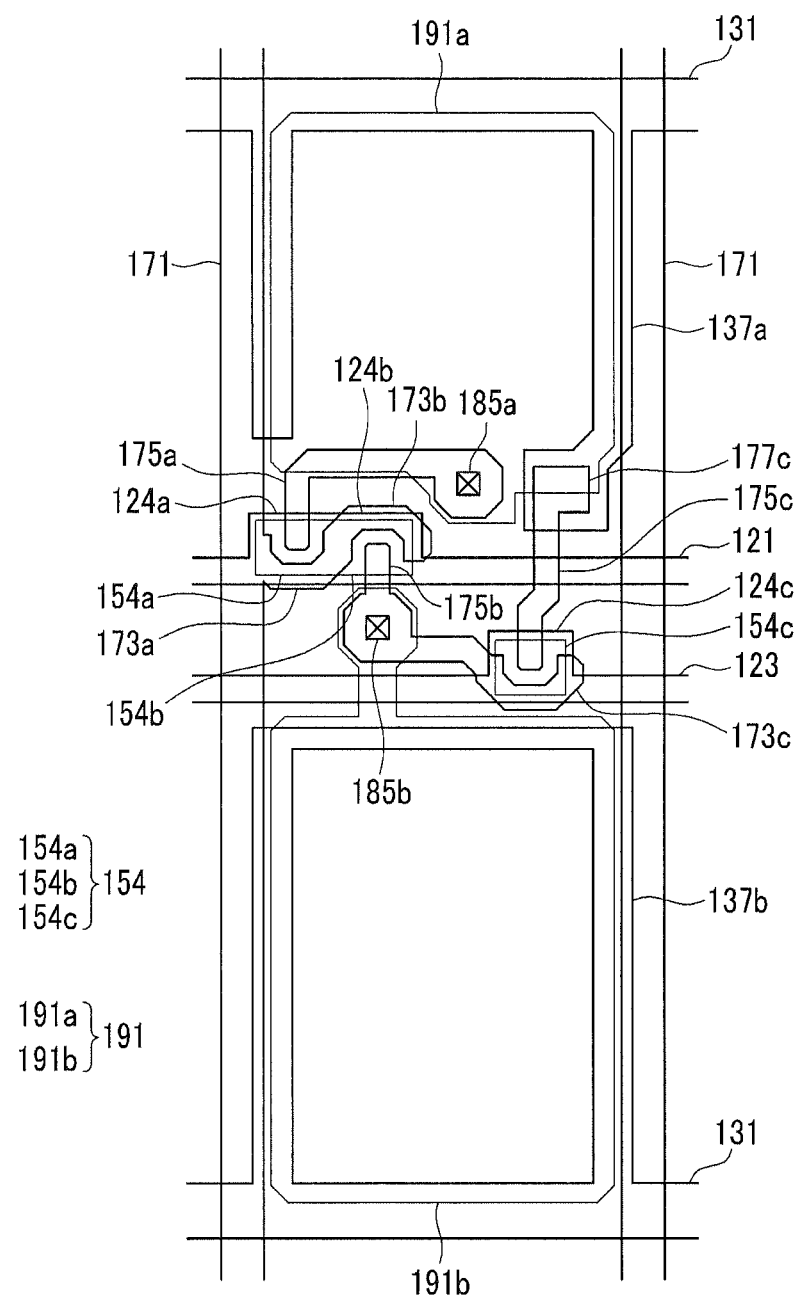
FIG. 8 is a plan view illustrating another exemplary embodiment of a lower display panel of the twisted nematic liquid crystal display device according to the present invention.

FIG. 7 is an equivalent circuit diagram illustrating another exemplary embodiment of a pixel of a twisted nematic liquid crystal display device according to the present invention and FIG. 8 is a plan view of a lower display panel of the twisted nematic liquid crystal display device according to the present invention.

The twisted nematic liquid crystal display device is similar to the twisted nematic liquid crystal display device as shown in FIGS. 5 and 6, therefore, duplicated parts will not described in detail below.

According to an exemplary embodiment, two auxiliary capacitors Cas1 and Cas2 connected with a third switching element Qc are formed.

According to an exemplary embodiment, the auxiliary capacitor includes a first auxiliary capacitor Cas1 and a second auxiliary capacitor Cas2. One terminal of the first auxiliary capacitor Cas1 is connected with an output terminal of the third switching element Qc and the other terminal of the first auxiliary capacitor Cas1 is connected with a storage electrode line SL. One terminal of the second auxiliary capacitor Cas2 is connected with the output terminal of the third switching element Qc and the other terminal of the second auxiliary capacitor Cas2 is connected with an output terminal of a first switching element Qa.

An exemplary embodiment of an operation of the twisted nematic liquid crystal display device according to the present invention will now be described. When the gate-on voltage is applied to the gate line GLn, the first and second switching elements Qa and Qb connected thereto are turned on and the data voltage of the data line 171 is applied to the first and second subpixel electrodes 191a and 191b as shown in FIG. 6.

Subsequently, when the gate-off voltage is applied to the gate line $GL_n$ and the gate-on voltage is applied to the subsequent gate line $GL_{n+1}$, the first and second switching elements Qa and Qb are turned off and the third switching element Qc is turned on. As a result, electric charges of the second subpixel electrode 191b as shown in FIG. 8 connected with an output terminal of the second switching element Qb flow into the first auxiliary capacitor Cas1 to drop the voltage of the second auxiliary liquid crystal capacitor Clcb.

Further, the voltage of the output terminal of the third switching element Qc, which is one terminal of the second auxiliary capacitor Cas2 increases and the voltage of the first subpixel electrode 191a as shown in FIG. 8 also increases due to a coupling phenomenon in the second auxiliary capacitor Cas2. Therefore, the voltage of the first liquid crystal capacitor Clca increases.

According to an exemplary embodiment, the charged voltages of the first and second liquid crystal capacitors Clca and Clcb are increased and decreased, respectively to be different from each other, thereby improving the side visibility of the liquid crystal display.

According to an exemplary embodiment, the wide end portion 177c of the third drain electrode 175c is partially overlapped with the extension portion 137a of the storage electrode line 131 to form the first auxiliary capacitor Cas1 unlike the second exemplary embodiment. Further, the wide end portion 177c of the third drain electrode 175c is partially overlapped with the first subpixel electrode 191a to form the second auxiliary capacitor Cas2.

Now referring to FIGS. 9 and 10, another exemplary embodiment twisted nematic liquid crystal display device according to the present invention will now be described in detail.

Figure 9:
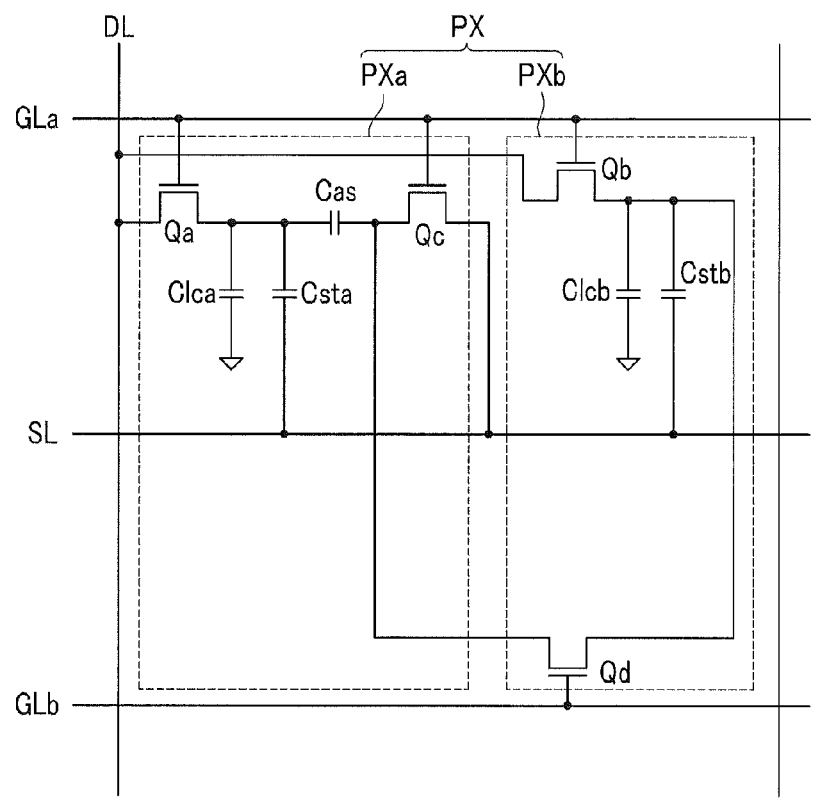
FIG. 9 is an equivalent circuit diagram illustrating another exemplary embodiment of a pixel of a twisted nematic liquid crystal display device according to the present invention.
Figure 10:
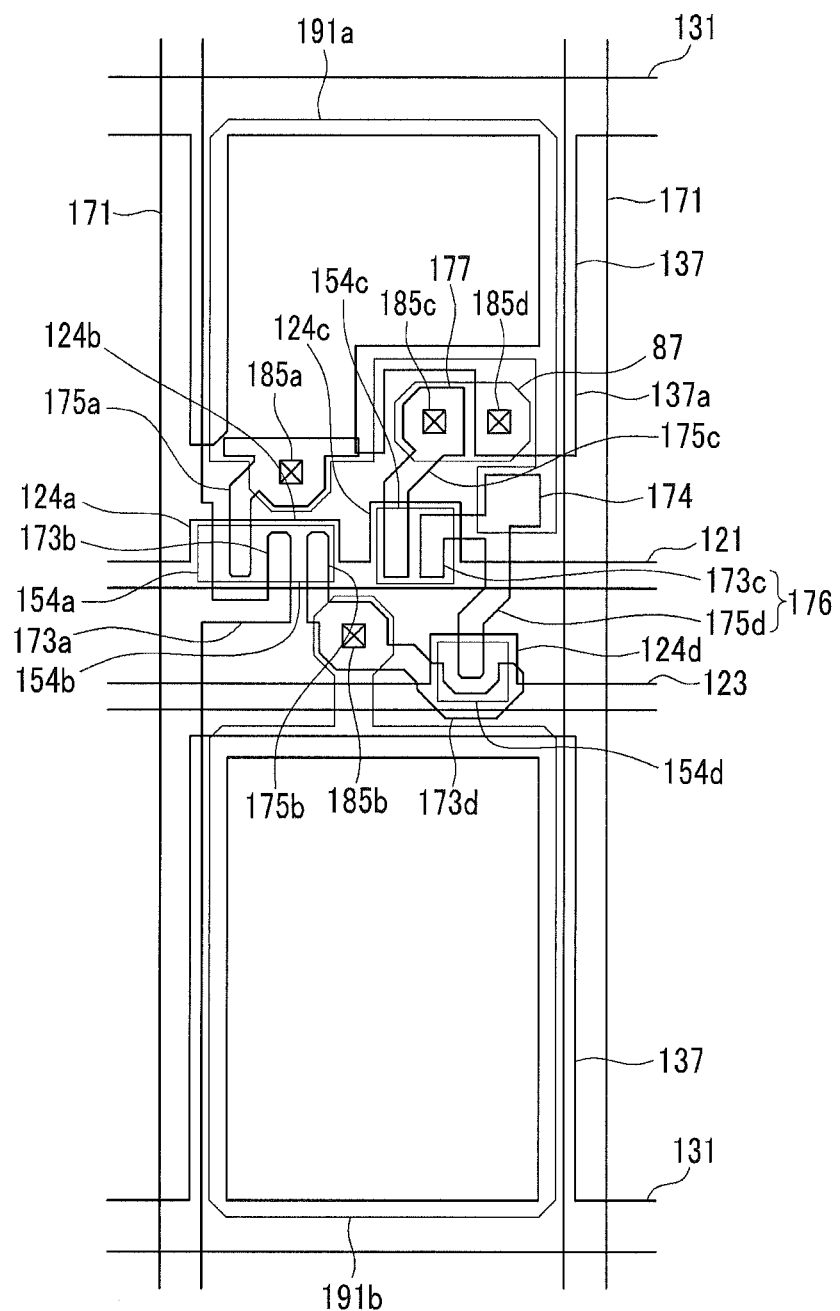
FIG. 10 is a plan view illustrating another exemplary embodiment of a lower display panel of the twisted nematic liquid crystal display device according to the present invention.

FIG. 9 is an equivalent circuit diagram illustrating an exemplary embodiment of a pixel of a twisted nematic liquid crystal display device according to the present invention, and FIG. 10 is a plan view of a lower display panel of the twisted nematic liquid crystal display device according to the present invention.

The twisted nematic liquid crystal display device includes signal lines including a plurality of gate lines GLn and GLn+1, a plurality of data lines DL, and a plurality of storage electrode lines SL and a plurality of pixels PX connected thereto. Each pixel PX includes a pair of first and second subpixels PXa and PXb. The first subpixel electrode 191a as shown in FIG. 10 is formed in the first subpixel PXa and the second subpixel electrode 191b as shown in FIG. 10 is formed in the second subpixel PXb.

The twisted nematic liquid crystal display device further includes first and second switching elements Qa and Qb connected to the gate line $GL_n$ and the data line DL, a first liquid crystal capacitor Clca and a first storage capacitor Csta that are connected to the first switching element Qa and formed in the first subpixel PXa, a second liquid crystal capacitor Clcb and a second storage capacitor Cstb which are connected with the second switching element Qb and formed in the second subpixel PXb, a third switching element Qc connected to the gate line GL and the storage electrode line SL, an auxiliary capacitor Cas formed between the first switching element Qa and the third switching element Qc, and a fourth switching element Qd which is connected with the second switching element Qb and the third switching element Qc and switched by the subsequent gate line $GL_{n+1}$.

According to an exemplary embodiment, the first and second switching elements Qa and Qb are provided on the lower display panel 100 includes a control terminal connected with the gate line GLn, an input terminal connected with the data line DL, and an output terminal to each of the first liquid crystal capacitor Clca and the first storage capacitor Csta and the second liquid crystal capacitor Clcb and the second storage capacitor Cstb.

The third switching element Qc which may also be a three-terminal element provided on the lower display panel 100 includes a control terminal connected to the gate line GL, an input terminal connected to the storage electrode line SL, and an output terminal connected to the fourth switching element Qd and the auxiliary capacitor Cas.

According to an exemplary embodiment, the fourth switching element Qd may also a three-terminal element provided on the lower display panel 100 and including a control terminal connected with the subsequent gate line $GL_{n+1}$, an input terminal connected with the second liquid crystal capacitor Clcb, and an output terminal connected with the output terminal of the third switching element Qd and the auxiliary capacitor Cas.

The first and second storage capacitor Csta and Cstb are connected with the first and second switching element Qa and Qb and the storage electrode line SL and perform an auxiliary role of the liquid crystal capacitors Clca and Clcb. The first and second storage capacitor Csta and Cstb are overlapped with the storage electrode line SL and the pixel electrode PE which are provided on the lower display panel 100 with an insulator interposed therebetween. A predetermined voltage such as a common voltage Vcom is applied to the storage electrode line SL.

According to an exemplary embodiment, a terminal of the auxiliary storage Cas is connected with the output terminal of the first switching element Qb and the other terminal of the auxiliary storage Cas is connected with the output terminal of the third switching element Qc and the output terminal of the fourth switching element Qd.

An exemplary embodiment of an operation of the twisted nematic liquid crystal display device according to the present invention will now be described. When the gate-on voltage is applied to the gate line GL, the first, second and third switching elements Qa, Qb, and Qc connected thereto are turned on.

Therefore, the data voltage applied to the data line DL is applied to the first and second subpixel electrodes 191a and 191b as shown in FIG. 10 through the first and second switching elements Qa and Qb which are turned on. According to an exemplary embodiment, the data voltages applied to the first and second subpixel electrodes 191a and 191b as shown in FIG. 10 are the same as each other. Therefore, the first and second liquid crystal capacitor Clca and Clcb are charged with a voltage corresponding to a difference between the common voltage and the voltage of the first and second subpixel electrode 191a and 191b as shown in FIG. 10. When the third switching element Qc is turned on, the common voltage Vcom applied to the storage electrode line SL is applied to the auxiliary electrode 174 as shown in FIG. 10 and the auxiliary capacitor Cas is charged with a voltage corresponding to a difference between the voltage of the first subpixel electrode (191a of FIG. 10) and the common voltage Vcom.

Subsequently, when the gate-on voltage is applied to the subsequent gate line $GL_{n+1}$, the fourth switching element Qd connected thereto is turned on. Therefore, the voltage of the second subpixel electrode 191b as shown in FIG. 10 is applied to the auxiliary electrode 174 as shown in FIG. 10 through the fourth switching element Qd which is turned on. As a result, a difference between the voltage of the first subpixel electrode 191a as shown in FIG. 10 which forms two electrodes of the auxiliary capacitor Cas together with the auxiliary electrode 174 as shown in FIG. 10 and the common voltage increases. Accordingly, a difference between a common voltage after the fourth switching element Qd is turned on and the voltage of the second subpixel electrode 191b as shown in FIG. 10 becomes smaller than a difference between a common voltage before the fourth switching element Qd is turned on and the voltage of the second subpixel electrode 191b as shown in FIG. 10 and a difference between a common voltage Vcom after the fourth switching element Qd is turned on and the voltage of the first subpixel electrode 191a as shown in FIG. 10 becomes larger than a difference between the common voltage Vcom before the fourth switching element Qd is turned on and the voltage of the first subpixel electrode 191a as shown in FIG. 10. That is, the charged voltage of the second liquid crystal capacitor Clcb after the fourth thin film transistor Qd is turned on becomes lower than the charged voltage of the first liquid crystal capacitor Clca.

As described above, the charged voltages of the first and second liquid crystal capacitors Clca and Clcb are different from each other to improve the side visibility of the liquid crystal display device.

According to another exemplary embodiment, the twisted nematic liquid crystal display device of the present invention includes a plurality of gate conductors including a plurality of first gate lines 121, a plurality of second gate lines 123, and a plurality of storage electrode lines 131 formed on an insulation substrate (not shown) which is made of transparent glass or plastic as shown in FIG. 10.

The first gate lines 121 and the second gate lines 123 extend in a horizontal direction and transfer a gate signal. The first gate line 121 includes a first gate electrode 124a, a second gate electrode 124b, and a third gate electrode 124c which protrudes in an upward direction. The second gate line 123 includes a fourth gate electrode 124d which protrudes in an upward direction. The first gate electrode 124a and the second gate electrode 124b are connected with each other to form one protrusion.

The storage electrode line 131 also extends in the horizontal direction and transfers a predetermined voltage such as a common voltage. The storage electrode line 131 includes a storage electrode 137 that extends vertically and the storage electrode 137 includes an end portion 137a having a large area. According to an exemplary embodiment of the present invention, the shapes and layouts of the storage electrode line 131 and the storage electrode 137 may be variously changed.

A gate insulating layer (not shown) is formed on the gate conductors 121, 123, and 131.

According to an exemplary embodiment, a plurality of island-shaped semiconductors 154 are formed on the gate insulating layer. Each semiconductor 154 includes a first semiconductor 154a positioned on the first gate electrode 124a, a semiconductor 154b positioned on the second gate electrode 124b, a third semiconductor 154c positioned on the third gate electrode 124c, and a fourth semiconductor 154d positioned on the fourth gate electrode 124d. The first semiconductor 154a and the second semiconductor 154b may be connected with each other.

A data conductor including a plurality of gate lines 171 and first, second and third drain electrodes 175a, 175b, and 175c and first and second electrode members 176 and 173d is formed on the semiconductor 154 and the gate insulating layer 140.

According to an exemplary embodiment, the data lines 171 transfer a data signal and extend in a vertical direction to cross the first gate line 121 and the second gate line 123. Each data line 171 includes a first source electrode 173a and a second source electrode 173b that extend toward the first gate electrode 124a and the second gate electrode 124b. The first source electrode 173a and the second source electrode 173b are connected with each other.

According to an exemplary embodiment, a portion of the first electrode member 176 forms a third source electrode 173c facing the third drain electrode 175c and the other portion of the first electrode member 176 forms the fourth drain electrode 175d. Further, the second electrode member 173d forms a fourth source electrode 173d facing the fourth drain electrode 175d.

The third drain electrode 175c extends to form an extension portion 177 facing the end portion 137a of the storage electrode 137.

The first, second, third, and fourth gate electrode 124a, 124b, 124c, 124d, the first, second, third, and fourth source electrode 173a, 173b, 173c, and 173d, and the first, second, third, fourth drain electrode 175a, 175b, 175c and 175d form one first, second, third, fourth switching elements Qa, Qb, Qc and Qd together with the first, second, third and fourth island-shaped semiconductor 154a, 154b, 154c and 154d. A channel of switching elements Qa, Qb, Qc and Qd is formed in each semiconductor 154a, 154b, 154c and 154d between each source electrode 173a, 173b, 173c and 173d and each drain electrode 175a, 175b, 175c and 175d.

According to an exemplary embodiment, the fourth source electrode 173d surrounds a part of the fourth drain electrode 175d. The fourth source electrode 173d is overlapped with the fourth gate electrode 124d, and faces and surrounds three sides of the rod-shaped fourth drain electrode 175d.

A passivation layer (not shown) is formed on the data conductors 171, 173d, 175a, 175b, 175c, and 176 and an exposed portion of the semiconductor 154a, 154b, 154c and 154d.

A plurality of contact holes 185a, 185b, 185c, and 185d exposing the first drain electrode 175a, the second drain electrode 175b, the extension portion 177 of the third drain electrode 175c, and the end portion 137a of the storage electrode 137, respectively are formed on the passivation layer.

A pixel electrode 191 including the first and second subpixel electrodes 191a and 191b and a connection member 87 are formed on the passivation layer.

According to an exemplary embodiment, the pixel electrode 191 has a substantially quadrangular shape and includes the first subpixel electrode 191a and the second subpixel electrode 191b that are spaced apart from each other by a predetermined gap.

The first subpixel electrode 191a is applied with a data voltage from the first drain electrode 175a through the contact hole 185a and the second subpixel electrode 191b is applied with the data voltage from the second drain electrode 175b through the contact hole 185b.

The first and second subpixel electrodes 191a and 191b form the first and second liquid crystal capacitors Clca and Clcb as shown in FIG. 2 together with the common electrode CE as shown in FIG. 2 of the upper display panel 200 as shown in FIG. 2 and the liquid crystal layer 3 as shown in FIG. 2 interposed therebetween to store the applied voltage even after the first and second switching elements Qa and Qb as shown in FIG. 9 are turned off.

The first and second subpixel electrodes 191a and 191b are overlapped with the storage electrode 137 to form the first and second storage capacitors Csta and Cstb and strengthen the voltage storing abilities of the first and second liquid crystal capacitors Clca and Clcb.

The connection member 87 electrically connects the extension portion 177 of the third drain electrode 175c and the one end portion 137a of the storage electrode 137 through the contact holes 185c and 185d.

According to an exemplary embodiment, a portion of the second electrode member 176 extends to form the auxiliary electrode 174 which is overlapped with the first subpixel electrode 191a. The first subpixel electrode 191a and the auxiliary electrode 174 form the auxiliary capacitor Cas with the passivation layer interposed therebetween.

Now, referring to FIGS. 11 and 12, an exemplary embodiment of a twisted nematic liquid crystal display device according to the present invention will now be described in detail.

Figure 11:
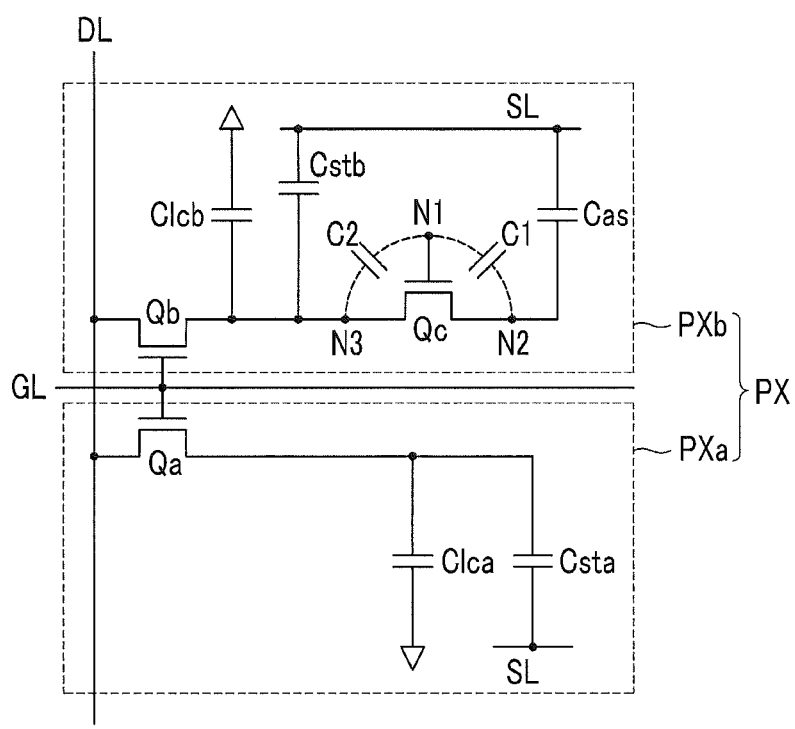
FIG. 11 is an equivalent circuit diagram illustrating another exemplary embodiment of a pixel of a twisted nematic liquid crystal display device according to the present invention.
Figure 12:
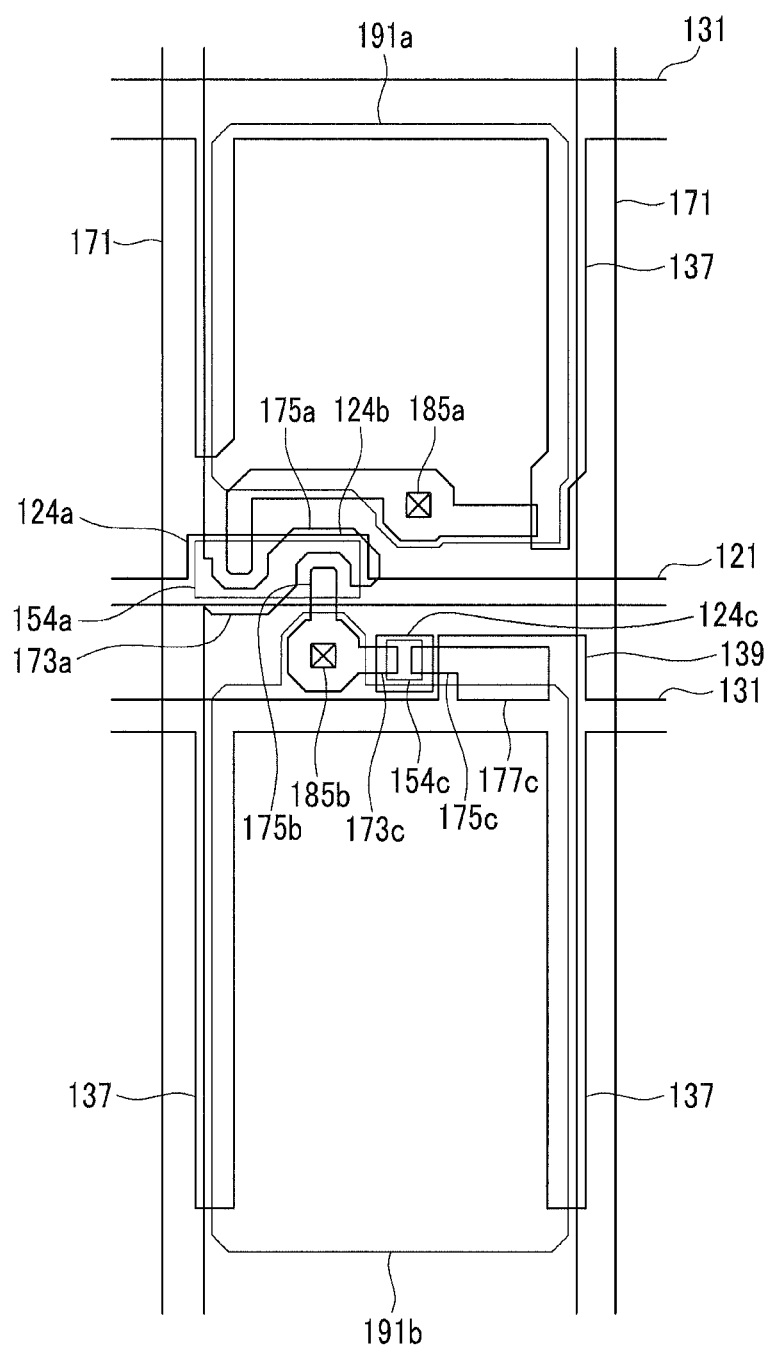
FIG. 12 is a plan view illustrating another exemplary embodiment of a lower display panel of the twisted nematic liquid crystal display device according to the present invention.

FIG. 11 is an equivalent circuit diagram illustrating an exemplary embodiment of a pixel of a twisted nematic liquid crystal display device according to the present invention and FIG. 12 is a plan view illustrating an exemplary embodiment of a lower display panel of the twisted nematic liquid crystal display device according to the present invention.

The twisted nematic liquid crystal display device includes signal lines including a plurality of gate lines $GL_n$ and $GL_{n+1}$, a plurality of data lines DL, and a plurality of storage electrode lines SL and a plurality of pixels PX connected thereto. Each pixel PX includes a pair of first and second subpixels PXa and PXb. The first subpixel electrode 191a as shown in FIG. 12 is formed in the first subpixel PXa and the second subpixel electrode 191b as shown in FIG. 12 is formed in the second subpixel PXb.

According to an exemplary embodiment, the twisted nematic liquid crystal display device further includes a first switching element Qa and a second switching element Qb that are connected with the gate line GL and the data line DL, a first liquid crystal capacitor Clca and a first storage capacitor Csta that are connected to the first switching element Qa and formed in the first subpixel PX, a second liquid crystal capacitor Clcb and a second storage capacitor Cstb that are connected with the second switching element Qb and formed in the second subpixel, a third switching element Qc including an input terminal connected with the second switching element Qb, a control terminal which is floated, and an output terminal, and an auxiliary capacitor Cas connected with the third switching element Qc and the storage electrode line SL.

The first and second switching elements Qa and Qb may be three-terminal elements such as a thin film transistor provided on a lower display panel 100, and including control terminals N1 thereof connected with the gate line GLn, input terminals N2 thereof connected with the data line DL, and output terminal N3 thereof connected with the first liquid crystal capacitor Clca and the first storage capacitor Csta and the second liquid crystal capacitor Clcb and the second storage capacitor Cstb, respectively.

The control terminal N1 of the third switching element Qc is floated, the input terminal N3 is connected with the second switching element Qb and the second liquid crystal capacitor Clcb, and the output terminal N2 is connected to the auxiliary capacitor Cas. The control terminal N1 and the output terminal N2 of the third switching element Qc form the first capacitor C1 together and the control terminal N1 and the input terminal N3 of the third switching element Qc form the second capacitor C2 together.

According to an exemplary embodiment, a terminal of the auxiliary capacitor Cas is connected to the output terminal N3 of the third switching element Qc and the other terminal is connected to the storage electrode line SL.

An exemplary embodiment of an operation of the twisted nematic liquid crystal display device according to the present invention will now be described. When a gate-on voltage is applied to the gate line GL, the first and second switching elements Qa and Qb which are connected thereto are turned on and a data voltage of the data line 171 is applied to the first and second subpixel electrodes 191a and 191b as shown in FIG. 12.

Thus, when a positive data voltage is applied to the data line DL, the voltage of the control terminal N1 increases while the positive data voltage is charged in the input terminal N3 of the third switching element Qc. Therefore, current flows from the input terminal N3 to the output terminal N2 of the third switching element Qc and the voltage of the output terminal N2 also increases.

When a gate-off voltage is applied to the gate line GL, the voltage of the output terminal N2, current continuously flows from the input terminal N3 to the output terminal N2 until the voltage of the input terminal N3, and the voltage of the control terminal N1 of the third switching element Qc are equal to each other, as a result, the voltage of the input terminal N3 decreases and the voltage of the output terminal N2 increases. The voltage of the second subpixel electrode 191b connected with the input terminal N3 of the third switching element Qc is lower than the previously applied positive data voltage which is lower than the voltage of the first subpixel electrode 191a and sustained during the rest frame. Further, the voltage of the output terminal N2 of the third switching element Qc is also sustained during the rest frame by the third capacitor C3.

As described above, the charged voltages of the first and second liquid crystal capacitors Clca and Clcb are different from each other to improve the side visibility of the liquid crystal display device.

According to an exemplary embodiment, the twisted nematic liquid crystal display device includes a plurality of gate conductors including a plurality of gate lines 121, a third gate electrode 124c, and a plurality of storage electrode lines 131 formed on an insulation substrate (not shown) which is made of transparent glass or plastic as shown in FIG. 12.

The gate lines 121 extend substantially in a horizontal direction and transfer a gate signal. The gate line 121 includes a first gate electrode 124a and a second gate electrode 124b that protrude upwards. The first gate electrode 124a and the second gate electrode 124b may be connected to each other.

A third gate electrode 124c has an island shape and is floated.

The storage electrode line 131 also extends in the horizontal direction and transfers a predetermined voltage such as a common voltage. The storage electrode line 131 includes a pair of auxiliary electrodes 139 that extend downwards and an auxiliary electrode 139 that protrudes in an upwards direction substantially vertical to the gate line 121.

A gate insulating layer (not shown) is formed on the gate conductors.

A plurality of island-shaped semiconductors 154 are formed on the gate insulating layer. Each semiconductor 154 includes a first semiconductor 154a positioned on the first gate electrode 124a, a second semiconductor 154b positioned on the second gate electrode 124b, and a third semiconductor 154c positioned on the third gate electrode 124c. The first semiconductor 154a and the second semiconductor 154b may be connected with each other.

A data conductor including the plurality of data lines 171, a plurality of first drain electrodes 175a, a plurality of second drain electrodes 175b, and a plurality of third drain electrodes 175c is formed on the semiconductor 154 and the gate insulating layer.

The data lines 171 transfer a data signal and extend primarily in a vertical direction to cross the gate lines 121 and the storage electrode lines 131. Each data line 171 includes a first source electrode 173a and a second source electrode 173b that may extend toward the first gate electrode 124a and the second gate electrode 124b and may be connected to each other.

The first drain electrode 175a, the second drain electrode 175b, and the third drain electrode 175c include one rod-shaped end portion and the other wide end portion having a greater area than the rod-shaped end portion. The rod-shaped end portions of the first drain electrode 175a and the second drain electrode 175b are partially surrounded by the first source electrode 173a and the second source electrode 173b, respectively. The wide one end portion of the second drain electrode 175b extends to form the rod-shaped third source electrode 173c and the third source electrode 173c faces the third drain electrode 175c. The wide one end portion 177c of the third drain electrode 175c is overlapped with the auxiliary electrode 139 of the storage electrode line 131 to form an auxiliary capacitor Cas.

The first, second and third gate electrode 124a, 124b and 124c, the first, second and third source electrode 173a, 173b and 173c, and the first, second and third drain electrode 175a, 175b and 175c form the first second and third switching elements Qa, Qb and Qc as shown in FIG. 11 together with the first, second and third semiconductor 154a, 154b and 154c. A channel of the respective switching element Qa, Qb and Qc is formed in each semiconductor 154a, 154b and 154c between each source electrode 173a, 173b and 173c and each drain electrode 175a, 175b and 175c.

A passivation layer (not shown) is formed on the data conductors 171, 175a, 175b, and 175c and exposed portions of the first, second, and third semiconductors 154a, 154b, and 154c.

A first contact hole 185a exposing the wide end portion of the first drain electrode 175a and a second contact hole 185b exposing the wide end portion of the second drain electrode 175b are formed on the passivation layer.

A plurality of pixel electrodes 191 are formed on the passivation layer. According to an exemplary embodiment, the pixel electrode 191 has a substantially quadrangular shape and includes the first subpixel electrode 191a and the second subpixel electrode 191b that are spaced apart from each other by a predetermined gap.

The first and second subpixel electrodes 191a and 191b form the first and second liquid crystal capacitors Clca and Clcb as shown in FIG. 2 together with the common electrode CE as shown in FIG. 2 of the upper display panel 200 as shown in FIG. 2 and the liquid crystal layer 3 as shown in FIG. 2 interposed therebetween to store the applied voltage even after the first and second switching elements Qa and Qb of FIG. 11 are turned off.

The first and second subpixel electrodes 191a and 191b are overlapped with the storage electrode 137 to form the first and second storage capacitors Csta and Cstb and strengthen the voltage storing abilities of the first and second liquid crystal capacitors Clca and Clcb.

Figure 13:
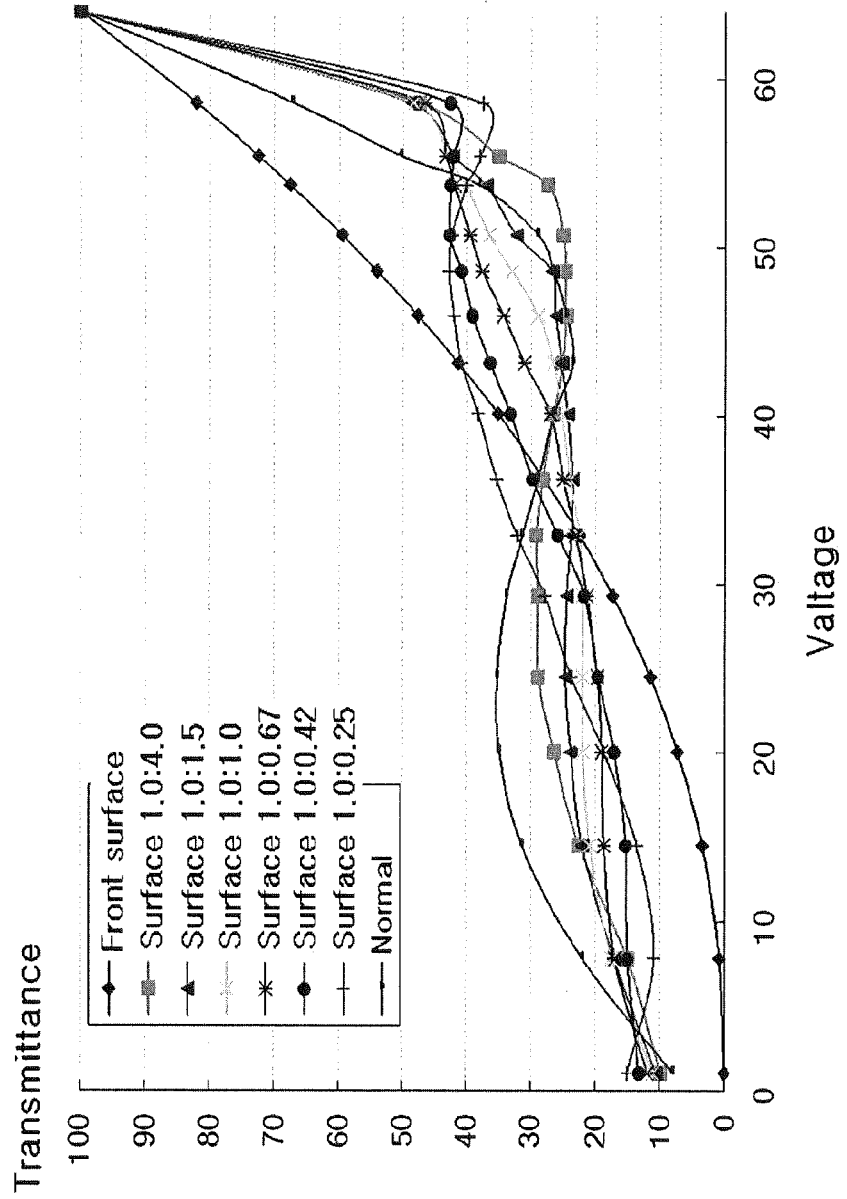
FIG. 13 is a graph illustrating an exemplary embodiment of voltage-transmittance depending on a ratio between a first subpixel electrode and a second subpixel electrode according to the present invention.

Referring to Table 1 and FIG. 13, a ratio of an area of the first subpixel electrode 191a to an area of the second subpixel electrode 191b in the twisted nematic liquid crystal display device according to the present invention may be about 0.66 or more. According to another exemplary embodiment, the area may be about 1.5 or less. If the area of the first subpixel electrode 191a and the area of the second subpixel electrode 191b are the same as each other, visibility can be improved while a contrast ratio is not remarkably deteriorated, thereby implementing the most optimization.

Table 1 shows a contrast ratio and visibility depending on the ratio between the first subpixel electrode 191a and the second subpixel electrode 191b and FIG. 13 is a graph showing voltage-transmittance depending on the ratio between the first subpixel electrode 191a and the second subpixel elec- trode 191b.

TABLE 1

| Area ratio | | | | | |
|---|---|---|---|---|---|
| First subpixel electrode 191a | Second subpixel electrode 191b | Lower visibility | Contrast ratio | Contrast ratio deterioration rate | Vsibility improvement rate |
| Criterion | | 0.79 | 1161 | | |
| 1 | 1.5 | 0.59-0.63 | 1066-1108 | −8%-1% | 34%-14% |
| 1 | 1 | 0.54-0.59 | 1002-1091 | −14%--1% | 44%-21% |
| 1 | 0.66 | 0.53-0.57 | 856-1057 | −27%--5% | 50%-26% |

Figure 14:
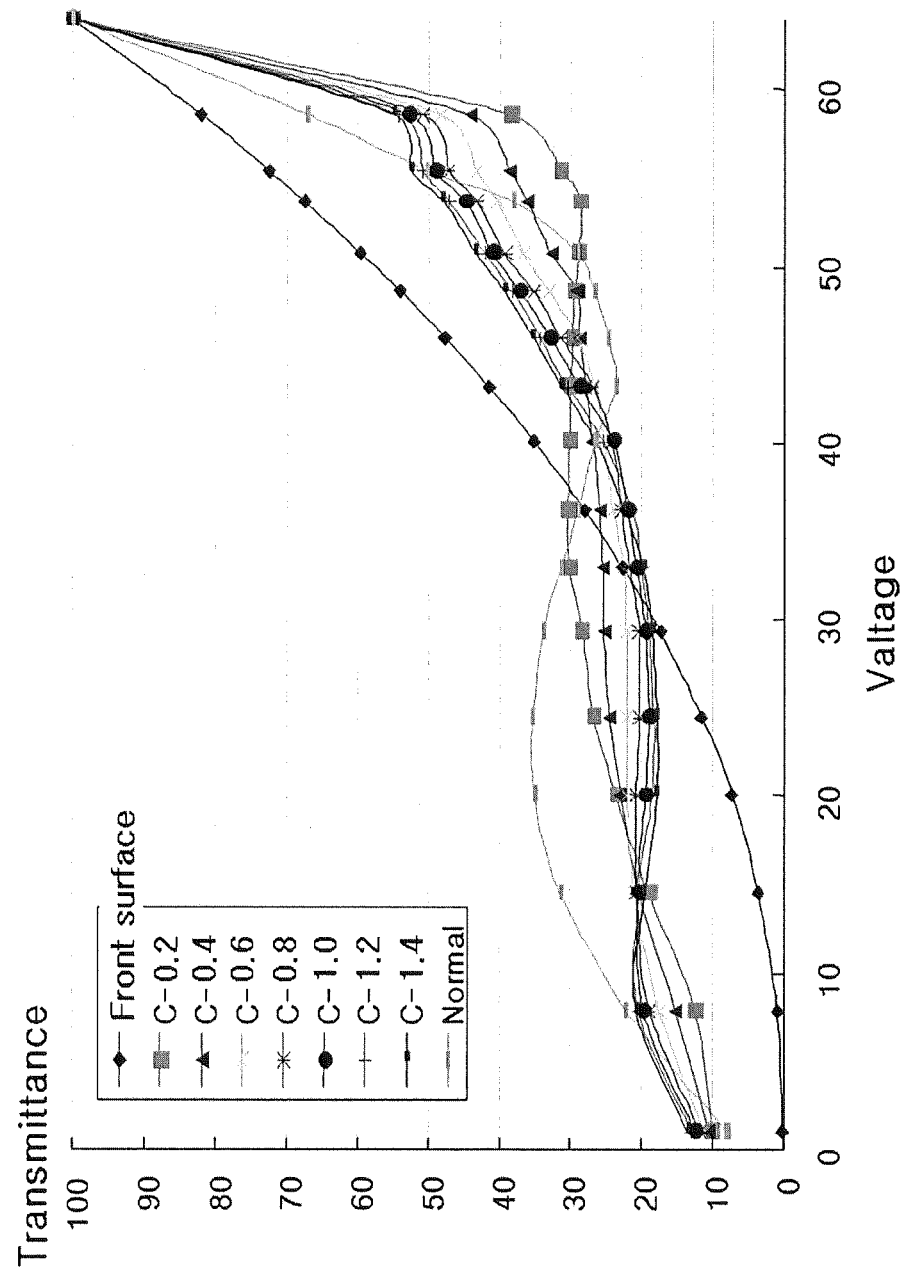
FIG. 14 is a graph illustrating an exemplary embodiment of voltage-transmittance depending on a ratio of an auxiliary capacitor to a first storage capacitor according to the present invention.

Further, referring to Table 2 and FIG. 14, when a ratio of the capacitance of the first storage capacitor Csta to the capacitance of the auxiliary capacitor Cas in the twisted nematic liquid crystal display device according to the present invention is about 0.4 or more, or about 1 or less, the visibility can be remarkably improved while minimizing the deterioration rate of the contrast ratio, thereby implementing the most optimization.

Table 2 shows a contrast ratio and visibility depending on the ratio of the auxiliary capacitor Cas to the first storage capacitor Csta and FIG. 14 is a graph showing voltage-transmittance depending on the ratio of the auxiliary capacitor Cas to the first storage capacitor Csta.

TABLE 2

| Ratio of auxiliary capacitor to first storage capacitor | Lower visibility | Contrast ratio | Contrast ratio deterioration rate | Vsibility improvement rate |
|---|---|---|---|---|
| Criterion | 0.72 | 1102 | | |
| 0.2 | 0.71 | 11123 | 2% | 3% |
| 0.4 | 0.63 | 1112 | 1% | 12% |
| 0.6 | 0.59 | 1091 | −1% | 21% |
| 0.8 | 0.58 | 1066 | −4% | 21% |
| 1.0 | 0.57 | 1040 | −6% | 22% |
| 1.2 | 0.57 | 1019 | −7% | 22% |
| 1.4 | 0.57 | 992 | −10% | 22% |

Referring to Tables 3 to 5, the liquid crystal layer 3 as shown in FIG. 2 of the twisted nematic liquid crystal display device according to the present invention may be formed by liquid crystals having a driving voltage in the range of about 2.5 to about 4V. Referring to Table 3, when the liquid crystal which is driven as a high voltage of about 5V is used, the contrast ratio deterioration rate is still larger than the visibility improvement rate. Referring to Tables 4 and 5, when the liquid crystal which is driven as a low voltage of about 4V or about 3.3V is used, the contrast ratio deterioration rate is also low as well as the visibility improvement rate is high.

Table 3 shows a contrast and visibility depending on the ratio between the first subpixel electrode 191a and the second subpixel electrode 191b when the liquid crystal having the driving voltage of about 5V is used, and Table 4 shows a contrast ratio and visibility depending on the ratio between the first subpixel electrode 191a and the second subpixel electrode 191b when the liquid crystal having the driving voltage of about 4V is used, and Table 5 shows a contrast ratio and visibility depending on the ratio between the first subpixel electrode 191a and the second subpixel electrode 191b when the liquid crystal having the driving voltage of about 3.3V is used.

TABLE 3

| Area ratio | | | | | |
|---|---|---|---|---|---|
| First subpixel electrode 191a | Second subpixel electrode 191b | Lower visibility | Contrast ratio | Contrast ratio deterioration rate | Vsibility improvement rate |
| Criterion | | 0.75 | 627 | | |
| 1 | 3 | 0.67 | 338 | −46% | 11% |
| 2 | 3 | 0.65 | 345 | −45% | 14% |
| 3 | 3 | 0.65 | 362 | −42% | 14% |
| 3 | 1 | 0.58 | 106 | −83% | 23% |
| 3 | 2 | 0.61 | 346 | −45% | 19% |
| 2 | 1 | 0.60 | 277 | −56% | 19% |

TABLE 4

| Area ratio | | | | | |
|---|---|---|---|---|---|
| First subpixel electrode 191a | Second subpixel electrode 191b | Lower visibility | Contrast ratio | Contrast ratio deterioration rate | Vsibility improvement rate |
| Criterion | | 0.79 | 1161 | | |
| 1 | 4 | 0.69 | 1138 | −2% | 14% |
| 1 | 1.5 | 0.59 | 1066 | −8% | 34% |
| 1 | 1 | 0.54 | 1002 | −14% | 44% |
| 1 | 0.66 | 0.53 | 856 | −27% | 50% |
| 1 | 0.43 | 0.54 | 572 | −61% | 46% |
| 1 | 0.25 | 0.60 | 180 | −85% | 33% |
| 1 | 1.88 | 0.64 | 1127 | −3% | 23% |

TABLE 5

| Area ratio | | | | | |
|---|---|---|---|---|---|
| First subpixel electrode 191a | Second subpixel electrode 191b | Lower visibility | Contrast ratio | Contrast ratio deterioration rate | Vsibility improvement rate |
| Criterion | | 0.72 | 1102 | | |
| 1 | 4 | 0.71 | 1125 | 2% | 1% |
| 1 | 1.88 | 0.67 | 1121 | 2% | 7% |
| 1 | 1.5 | 0.63 | 1108 | 1% | 14% |
| 1 | 1 | 0.59 | 1091 | −1% | 21% |
| 1 | 0.66 | 0.57 | 1057 | −5% | 26% |
| 1 | 0.43 | 0.57 | 963 | −13% | 27% |
| 1 | 0.25 | 0.62 | 612 | −45% | 16% |

The twisted nematic liquid crystal display device according to the present invention has a voltage-transmittance curve which is distorted because the voltage of the second subpixel electrode 191b is lower than that of the first subpixel electrode 191a and may include a polarizer which can prevent light leakage in a black state from being increased due to the increase in retardation, and improve a viewing angle.

Now, referring to FIG. 15, an exemplary embodiment of a polarizer of the twisted nematic liquid crystal display device according to the present invention will now be described in detail.

Figure 15:
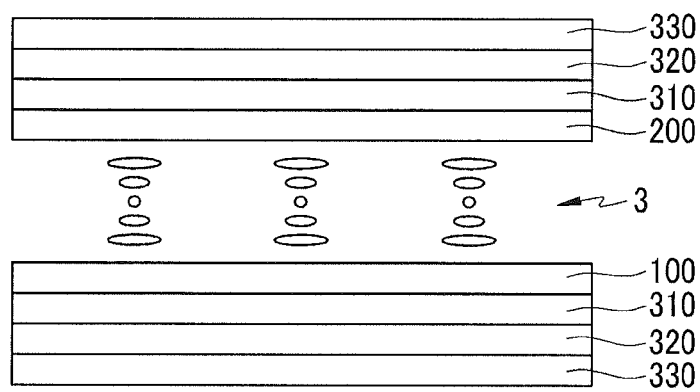
FIG. 15 is a diagram illustrating an exemplary embodiment of a polarizer of the twisted nematic liquid crystal display device according to the present invention.

FIG. 15 is a diagram illustrating an exemplary embodiment of a polarizer of the twisted nematic liquid crystal display device according to the present invention.

The polarizer includes a discotic liquid crystal ("DLC") layer 310 formed on outer surfaces of a lower display panel 100 and an upper display panel 200 facing each other with a liquid crystal layer 3 interposed therebetween, a tri acetyl cellulous ("TAC") layer 320 formed on an outer surface of the DLC layer 310, and a poly vinyl alcohol ("PVA") layer 330 formed on an outer surface of the TAC layer 320.

According to an exemplary embodiment, the DLC layer 310 is formed by an alkyl-group substituted organic material having a flexible structure around an aromatic core having a rigid structure of a disk type. The retardation in the thickness direction of the DLC layer 310 may be in the range of about 150 nm to about 180 nm. Discotic liquid crystals constituting the DLC layer 310 have inclinations of various angles. The average inclination angle of the DLC layer 310 may be in the range of about 45 degrees to about 50 degrees.

The TAC layer 320 is a layer for compensating a phase difference. The retardation in the thickness direction of the TAC layer 320 may be in the range of about 70 nm to about 100 nm.

The PVA layer 330 is a film that extends by absorbing and aligning Oxo (iodine) or dichroic pigments such as dichroic dyes, which is one example of an optical film.

Now, referring to FIG. 16, another exemplary embodiment of a polarizer of the twisted nematic liquid crystal display device according to the present invention will now be described in detail.

Figure 16:
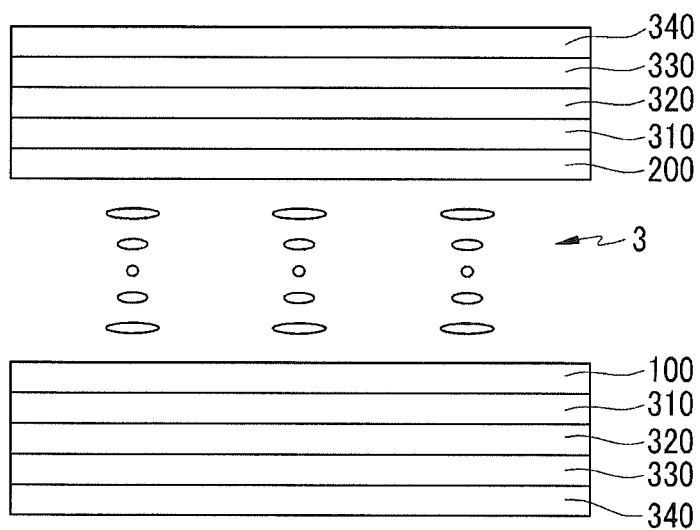
FIG. 16 is a diagram illustrating another exemplary embodiment of a polarizer of the twisted nematic liquid crystal display device according to the present invention.

FIG. 16 is a diagram illustrating a polarizer of the twisted nematic liquid crystal display device according to the present invention.

The polarizer includes a discotic liquid crystal ("DLC") layer 310 formed on outer surfaces of a lower display panel 100 and an upper display panel 200 facing each other with a liquid crystal layer 3 interposed therebetween, a tri acetyl cellulous ("TAC") layer 320 formed on an outer surface of the DLC layer 310, a poly vinyl alcohol ("PVA") layer 330 formed on an outer surface of the TAC layer 320, and a compensation film 340 formed on an outer surface of the PVA layer 330.

The compensation film 340 is formed by at least one of a biaxial film an A-plate, and a C-plate. The retardation of the compensation film may be in the range of about 70 nm to about 150 nm.

Further, when the retardation in the thickness direction of the DLC layer 310 may be in the range of about 150 nm to about 180 nm, the average inclination angle of the DLC layer 310 may be in the range of about 45 degrees to about 50 degrees, and the retardation in the thickness direction of the TAC layer 320 may be in the range of about 70 nm to about 100 nm, the retardation of the compensation film 340 may be in the range of about 55 nm to about 70 nm.

Now, referring to FIG. 17, a polarizer of the twisted nematic liquid crystal display device according to the present invention will now be described in detail.

Figure 17:
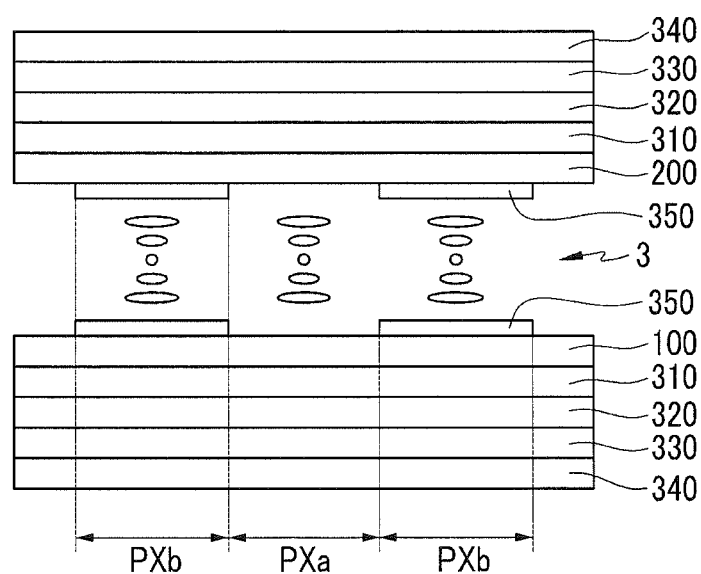
FIG. 17 is a diagram illustrating another exemplary embodiment of a polarizer of the twisted nematic liquid crystal display device according to the present invention.

FIG. 17 is a diagram illustrating an exemplary embodiment of a polarizer of the twisted nematic liquid crystal display device according to the present invention.

The polarizer includes a discotic liquid crystal ("DLC") layer 310 formed on outer surfaces of a lower display panel 100 and an upper display panel 200 facing each other with a liquid crystal layer 3 interposed therebetween, a tri acetyl cellulous ("TAC") layer 320 formed on an outer surface of the DLC layer 310, a poly vinyl alcohol ("PVA") layer 330 formed on an outer surface of the TAC layer 320, and a polarizer pattern 350 formed on an inner surface of at least one of the lower display panel 100 and the upper display panel 200.

According to an exemplary embodiment, the polarizer pattern 350 as a C-plate pattern for compensating the retardation is provided only the second subpixel PXb since the retardation degrees of the first subpixel PXa and the second subpixel PXb are different from each other. Further, all components are formed on the inner surfaces of the lower display panel 100 and the upper display panel 200 and the polarizer pattern 350 is applied thereonto and thereafter, the first subpixel PXa is removed through a photolithography process and only the second subpixel PXb is left to form the C-plate pattern.

The retardation of the polarizer pattern 350 may be in the range of about 70 nm to about 150 nm.

Further, when the retardation in the thickness direction of the DLC layer 310 may be in the range of about 150 nm to about 180 nm, the average inclination angle of the DLC layer 310 may be in the range of about 45 degrees to about 50 degrees, and the retardation in the thickness direction of the TAC layer 320 may be in the range of about 70 nm to about 100 nm, the retardation of the polarizer pattern 350 may be in the range of about 55 nm to about 70 nm.

According to an exemplary embodiment the polarizer may further include the compensation film 340 which is formed by at least one of the biaxial film, the A-plate, and the C-plate, which are formed outside of the PVA layer 330.

When the retardation in the thickness direction of the DLC layer 310 may be in the range of about 150 nm to about 180 nm, the average inclination angle of the DLC layer 310 may be in the range of about 45 degrees to 50 degrees, and the retardation in the thickness direction of the TAC layer 320 may be in the range of about 70 nm to about 100 nm, the retardation of the compensation film 340 may be in the range of about 55 nm to about 100 nm and the retardation of the polarizer pattern 350 may be in the range of about 55 nm to about 70 nm.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A twisted nematic liquid crystal display device, comprising:
    a first substrate;
    a plurality of gate lines and a plurality of data lines formed on the first substrate;
    a plurality of pixels connected with the gate lines and the data lines, and each pixel comprising a first subpixel and a second subpixel;
    a first subpixel electrode formed in the first subpixel;
    a second subpixel electrode formed in the second subpixel;
    a switching element connected with a gate line of the gate lines and a data line of the data lines;
    a first liquid crystal capacitor and a first storage capacitor connected with the switching element and formed in the first subpixel;
    a second liquid crystal capacitor and a second storage capacitor connected with the switching element and formed in the second subpixel; and
    an auxiliary capacitor formed between the switching element and the second liquid crystal capacitor,
    wherein a voltage of the first subpixel electrode is greater than a voltage of the second subpixel electrode, and a ratio of an area of the second subpixel electrode to an area of the first subpixel electrode is in a range of about 0.66 to about 1.5.

2. The twisted nematic liquid crystal display device of claim 1, wherein:
    the area of the first subpixel electrode is equal to that of the second subpixel electrode.

3. The twisted nematic liquid crystal display device of claim 1, wherein:
    a ratio of a capacitance of the auxiliary capacitor to a capacitance of the first storage capacitor is in a range of about 0.4 to about 1.

4. The twisted nematic liquid crystal display device of claim 1, further comprising:
    a second substrate facing the first substrate; and
    a liquid crystal layer formed between the first substrate and the second substrate,
    wherein the liquid crystal layer comprises liquid crystals having a driving voltage in a range of about 2.5 to about 4V.

5. The twisted nematic liquid crystal display device of claim 1, further comprising:
    a second substrate facing the first substrate;
    a discotic liquid crystallayer formed on outer surfaces of the first substrate and the second substrate;
    a tri acetyl cellulous layer formed on an outer surface of the discotic liquid crystal layer; and
    a poly vinyl alcohol layer formed on the outer surface of the tri acetyl cellulous layer.

6. The twisted nematic liquid crystal display device of claim 5, wherein:
    a retardation in a thickness direction of the discotic liquid crystal layer is in a range of about 150 nm to about 180 nm,
    an average inclination angle of the discotic liquid crystal layer is in a range of about 45 degrees to about 50 degrees, and
    a retardation in a thickness direction of the tri acetyl cellulous layer is in a range of about 70 nm to about 100 nm.

7. The twisted nematic liquid crystal display device of claim 5, further comprising:
    a compensation film formed by at least one of a biaxial film, an A-plate, and a C-plate formed on the outer surface of the poly vinyl alcohol layer,
    wherein a retardation of the compensation film is in a range of about 70 nm to about 150 nm.

8. The twisted nematic liquid crystal display device of claim 6, further comprising:
    a compensation film formed by at least one of a biaxial film, an A-plate, and a C-plate formed on an outer surface of the poly vinyl alcohol a layer,
    wherein a retardation of the compensation film is in a range of about 55 nm to about 70 nm.

9. The twisted nematic liquid crystal display device of claim 5, further comprising:
    a polarizer pattern formed in the second subpixel on an inner surface of at least one of the first substrate and the second substrate,
    wherein a retardation of the polarizer pattern is in a range of about 70 nm to about 150 nm.

10. The twisted nematic liquid crystal display device of claim 6, further comprising:
    a polarizer pattern formed in the second subpixel on an inner surface of at least one of the first substrate and the second substrate,
    wherein a retardation of the polarizer pattern is in a range of about 55 nm to about 70 nm.

11. The twisted nematic liquid crystal display device of claim 5, further comprising:
- a compensation film formed by at least one of a biaxial film, an A-plate, and a C-plate formed on an outer surface of the poly vinyl alcohol layer; and
- a polarizer pattern formed in the second subpixel on an inner surface of at least one of the first substrate and the second substrate,
- wherein a retardation of the compensation film is in a range of about 55 nm to about 100 nm, and
- a retardation of the polarizer pattern is in a range of about 55 nm to about 70nm.

12. The twisted nematic liquid crystal display device of claim 1, further comprising:
- a polarizer pattern formed in the second subpixel on an inner surface of at least one of the first substrate and the second substrate,
- wherein a retardation of the polarizer pattern is in a range of about 70 nm to about 150 nm.

13. The twisted nematic liquid crystal display device of claim 12, wherein:
- the polarizer pattern is in a C-plate pattern.

14. A twisted nematic liquid crystal display device, comprising:
- a first substrate;
- a plurality of gate lines and a plurality of data lines formed on the first substrate;
- a plurality of pixels connected with the gate lines and the data lines, and each pixel comprising a first subpixel and a second subpixel;
- a first subpixel electrode formed in the first subpixel;
- a second subpixel electrode formed in the second subpixel;
- a first switching element and a second switching element connected with a gate line of the gate lines and a data line of the data lines;
- a first liquid crystal capacitor and a first storage capacitor connected with the first switching element and formed in the first subpixel;
- a second liquid crystal capacitor and a second storage capacitor connected with the second switching element and formed in the second subpixel;
- a third switching element connected with the second switching element and switched by a subsequent gate line of the gate line connected with the first switching element; and
- an auxiliary capacitor connected with the third switching element,
- wherein a ratio of a capacitance of the auxiliary capacitor to a capacitance of the first storage capacitor is in a range of about 0.4 to about 1.

15. A twisted nematic liquid crystal display device, comprising:
- a first substrate;
- a plurality of gate lines and a plurality of data lines formed on the first substrate;
- a plurality of pixels connected with the gate lines and the data lines, and each pixel comprising a first subpixel and a second subpixel;
- a first subpixel electrode formed in the first subpixel;
- a second subpixel electrode formed in the second subpixel;
- a plurality of storage electrode lines;
- a first switching element and a second switching element connected with a gate line of the gate lines and a data line of the data lines;
- a first liquid crystal capacitor and a first storage capacitor connected with the first switching element and formed in the first subpixel;
- a second liquid crystal capacitor and a second storage capacitor connected with the second switching element and formed in the second subpixel;
- a third switching element connected with the gate line and the storage electrode line;
- an auxiliary capacitor formed between the first switching element and the third switching element; and
- a fourth switching element connected with the second switching element and the third switching element and switched by a subsequent gate line of a gate line connected with the first, second and third switching elements,
- wherein a ratio of the capacitance of the auxiliary capacitor to a capacitance of the first storage capacitor is in a range of about 0.4 to about 1.

16. A twisted nematic liquid crystal display device, comprising:
- a first substrate;
- a plurality of gate lines and a plurality of data lines formed on the first substrate;
- a plurality of pixels connected with the gate lines and the data lines, and each pixel comprising a first subpixel and a second subpixel;
- a first subpixel electrode formed in the first subpixel;
- a second subpixel electrode formed in the second subpixel;
- a plurality of storage electrode lines;
- a first switching element and a second switching element connected with a gate line of the gate lines and a data line of the data lines;
- a first liquid crystal capacitor and a first storage capacitor connected with the first switching element;
- a second liquid crystal capacitor and a second storage capacitor connected with the second switching element;
- a third switching element including an input terminal connected to the second switching element, a control terminal which is floated, and an output terminal; and
- an auxiliary capacitor connected with the third switching element and the storage electrode line.

17. The twisted nematic liquid crystal display device of claim 16, wherein:
- a ratio of the capacitance of the auxiliary capacitor to a capacitance of the first storage capacitor is in a range of about 0.4 to about 1.

* * * * *